(12) United States Patent
Bramwell et al.

(10) Patent No.: US 7,565,271 B2
(45) Date of Patent: *Jul. 21, 2009

(54) QUALITY ANALYSIS METHOD AND PROGRAM

(75) Inventors: Denton Bramwell, Layton, UT (US); Klinton Washburn, Willard, UT (US)

(73) Assignee: Promontory Management Group, Inc., Layton, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/520,283

(22) Filed: Sep. 13, 2006

(65) Prior Publication Data

US 2007/0010970 A1  Jan. 11, 2007

Related U.S. Application Data

(63) Continuation of application No. 11/220,800, filed on Sep. 7, 2005.

(51) Int. Cl.
 *G06F 11/30* (2006.01)
(52) U.S. Cl. .................................. 702/183; 715/771
(58) Field of Classification Search ......... 702/181–183, 702/179; 715/764, 781, 771; 700/108–110; 714/46–47
See application file for complete search history.

(56) References Cited

U.S. PATENT DOCUMENTS

| | | | |
|---|---|---|---|
| 5,731,572 A | 3/1998 | Winn | |
| 6,253,115 B1 | 6/2001 | Martin et al. | |
| 6,571,202 B1 | 5/2003 | Loman et al. | |
| 6,664,981 B2 | 12/2003 | Ashe et al. | |
| 6,675,135 B1 | 1/2004 | Murray et al. | |
| 6,754,847 B2 * | 6/2004 | Dalal et al. | 714/27 |
| 6,799,712 B1 * | 10/2004 | Austen et al. | 228/102 |
| 6,871,182 B1 * | 3/2005 | Winnard et al. | 705/7 |
| 6,945,458 B1 * | 9/2005 | Shah et al. | 235/385 |
| 2004/0064438 A1 | 4/2004 | Kostoff | |
| 2005/0096950 A1 | 5/2005 | Caplan et al. | |

OTHER PUBLICATIONS

"JMPer Cable," A Technical Publication for JMP Users; Issue 18 (2005), pp. 1-15.

* cited by examiner

*Primary Examiner*—Edward Raymond
*Assistant Examiner*—Mary C Baran
(74) *Attorney, Agent, or Firm*—Holland & Hart LLP

(57) ABSTRACT

A graphical user interface for a quality analysis computer program includes a first display area for displaying graphical representations of statistical data and a second display area containing a tree representation of a quality analysis project. The tree representation may include one or more quality analysis project steps, one or more statistical tool categories associated with the one or more quality analysis project steps, and one or more statistical tools associated with the one or more statistical tool categories.

29 Claims, 22 Drawing Sheets

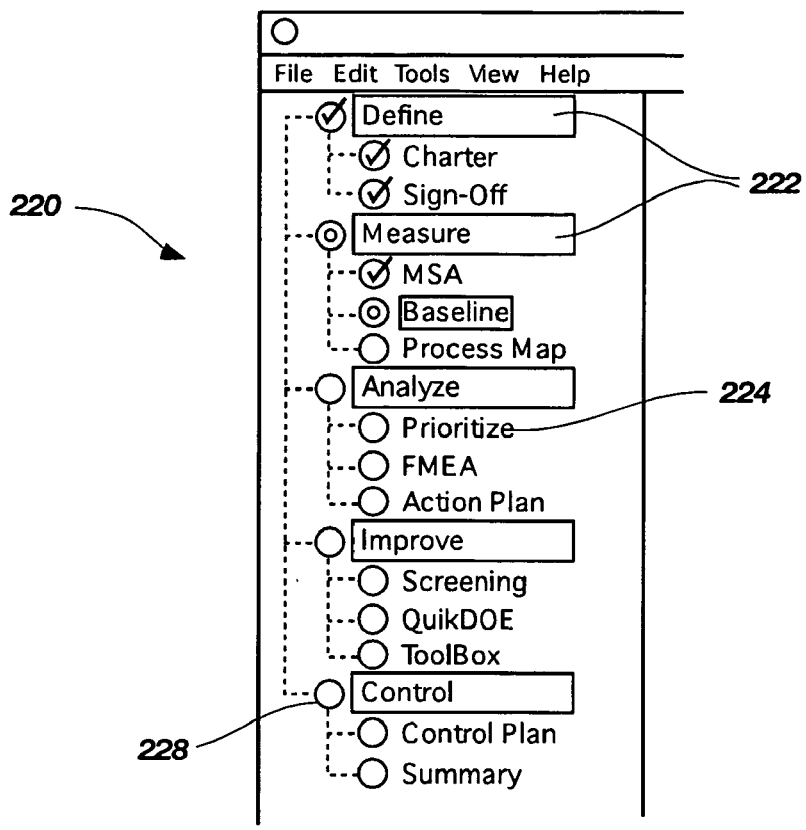
FIG. 2B
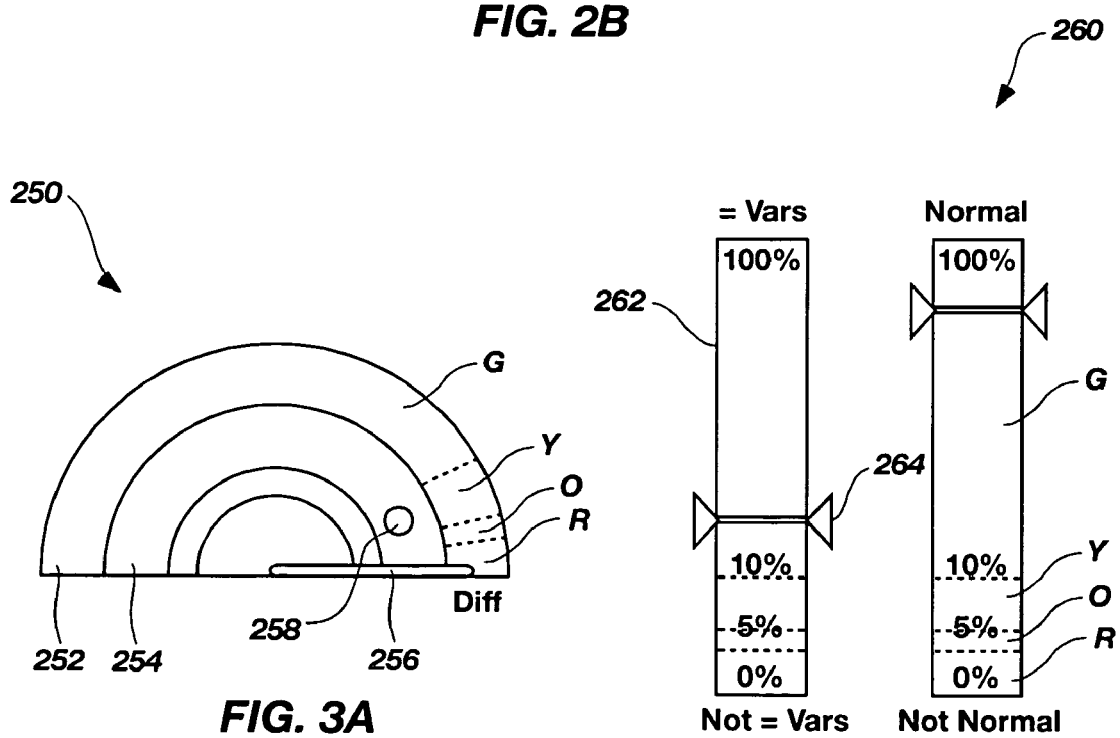
FIG. 3A
FIG. 3B

| Session | Residuals | Y = | Effects | X | Scatter | ANOM | Xc | Optimize |
|---|---|---|---|---|---|---|---|---|
| | | harvest weight | | avg temp | avg water | | soil type | pesticide |
| 1 | | 230.177 | | 87.3397 | 2.96721 | | sand | yes |
| 2 | | 243.284 | | 73.7216 | 5.55348 | | loam | no |
| 3 | | 239.752 | | 91.0347 | 4.22602 | | sand | no |
| 4 | | 244.530 | | 81.9907 | 6.14481 | | sand | no |
| 5 | | 237.473 | | 76.1887 | 4.66752 | | sand | no |

Y
X
Xc

Cut         Ctrl+X
Copy        Ctrl+C
Paste       Ctrl+V
Insert Column
Delete Column
Sort
Delete      Del
Flag Disable
Flag Remove
Clear Flag(s)

FIG. 12

| | | | | Coef | SSQ |
|---|---|---|---|---|---|
| A | -BC | -DE | -FG | -0.12 | 0.11 |
| B | -AC | -DF | -EG | 7.66 | 468.95 |
| C | -AB | -DG | -EF | 0.44 | 1.58 |
| D | -AE | -BF | -CG | 14.96 | 1789.52 |
| E | -AD | -BG | -CF | -0.17 | 0.22 |
| F | -AG | -BD | -CE | -8.63 | 595.64 |
| G | -AF | -BE | -CD | 0.36 | 1.03 |

Compare Round 1

| | | | | Coef | SSQ |
|---|---|---|---|---|---|
| A | +BC | +DE | +FG | 0.28 | 0.65 |
| B | +AC | +DF | +EG | 6.41 | 328.7 |
| C | +AB | +DG | +EF | -0.04 | 0.01 |
| D | +AE | +BF | +CG | 14.5 | 1682 |
| E | +AD | +BG | +CF | -0.23 | 0.42 |
| F | +AG | +BD | +CE | 7.98 | 509.44 |
| G | +AF | +BE | +CD | 0.04 | 0.01 |

Compare Round 1

| Effects | Scatter | ANOM | Optimize | |
|---|---|---|---|---|
| | | Xc | Xc | |
| vg | Y | type | pesticide | |
| 66.8 | ✓ X | nd | no | |
| 66.9 | | am | yes | |
| 68.4 | Xc | nd | yes | |
| 68. | Blocks | nd | no | |
| 69. | Center Points | ay | no | |
| 69. | | am | yes | |
| 69.0 | ✂ Cut    Ctrl+X | ay | yes | |
| 69.8 | 🗗 Copy   Ctrl+C | nd | yes | |
| 69.8 | 📋 Paste  Ctrl+V | nd | yes | |
| 70.3 | | ay | yes | |
| 70.4 | Insert Column | nd | no | |
| 70. | Delete Column | ay | no | |
| 70. | | | yes | |
| 72. | ↕ Sort      ▶ | ¹₂↑ Ascending | | |
| 73. | ✕ Delete  Del | ↓²₁ Descending | | |
| 73. | | am | no | |
| 74.0 | ⚑ Flag Disable | am | no | |
| 75.0 | ⊘ Flag Remove | am | no | |
| 75.0 | Clear Flag(s) | nd | yes | |
| 76. | | nd | no | |
| 77.9909 | 4.74531 | loam | yes | |

FIG. 20A

QUALITY ANALYSIS METHOD AND PROGRAM

This application is a continuation of U.S. patent application Ser. No. 11/220,800, filed 7 Sep. 2005, and entitled "Quality Analysis Method and Program," the entirety of which is incorporated herein by reference.

FIELD OF THE INVENTION

The present invention relates generally to the field of quality analysis tools and programs.

BACKGROUND OF THE INVENTION

Heightened consumer demand for highly reliable goods and services has made quality an increasingly important issue for businesses. This ever-growing consumer demand for quality has lead to an increased emphasis placed on quality control and improvement at virtually all levels of business operations, including engineering, manufacturing, distribution, and other administrative operations. Over the years, various quality analysis tools and computer programs have been developed in an attempt to aid businesses analyze and improve the quality of their processes and products. Such conventional tools and computer programs, however, suffer from a number of drawbacks and deficiencies.

For example, while many conventional quality analysis computer programs are capable of performing various statistical tasks and experiments that, when performed correctly, may help businesses identify ways to improve the quality of their products and processes, the user interface employed in such programs is typically designed for use by highly skilled statisticians. In particular, the terminology used, the user input required to design tests and experiments, and the manner in which the results of such experiments are displayed in conventional quality analysis programs typically require specialized training and expertise in the field of statistics for sufficient operation and comprehension of the same. As a result, business owners, management personnel, and other decision makers having minimal experience in statistics generally find the use and application of such programs intimidating, problematic, and unproductive.

Accordingly, there exists a need for a system, method and program capable of maximizing the functionality and success of process improvement projects, while minimizing the effort and complexity presented to the user. More particularly, there exists a need for a simplified user interface for a quality analysis computer program capable of enabling persons with only minimal training in statistics to simply, efficiently and effectively analyze and improve processes.

SUMMARY OF THE INVENTION

In certain embodiments, a graphical user interface for a quality analysis computer program, which may be stored as computer-readable instructions on a computer-readable medium, includes a first display area for displaying graphical representations of statistical data and a second display area containing a tree representation of a quality analysis project. The tree representation may include one or more quality analysis project steps, one or more statistical tool categories associated with the one or more quality analysis project steps, and one or more statistical tools associated with the one or more statistical tool categories. One or more status indicators configured to graphically display the status of each quality analysis project step in the quality analysis project may also be displayed in the second display area.

In certain embodiments, the graphical representations comprise a "gas gauge" type graph for graphically representing the results of a statistical test. These graphical representations may also comprise one or more slider bars for graphically representing the results of a statistical test.

The interface may also comprise a capability study display area displayed in the first display area and configured to display the results of a capability study. In many embodiments, the capability study display area comprises a first portion displaying a percentage of non-conforming material produced in a process, a second portion displaying a percentage of non-conforming material that would be produced in the process if an extraordinary variation is removed, a third portion displaying a percentage of non-conforming material that would be produced in the process if the mean of the process is centered between the specification limits, and a fourth portion displaying a percentage of non-conforming material that would be produced in the process if the extraordinary variation is removed and the mean of the process is centered.

In certain aspects, the graphical representations may also comprise a trended process behavior chart comprising a trendline serving as a centerline of the process behavior chart and parallel limit lines having the same slope as and positioned to surround the trendline. The interface may also comprise a behavior chart interface displayed in the first display area and configured to enable a user to split a process behavior chart into segments, with the behavior chart comprising an input box for receiving a beginning point of each segment of the split process behavior chart.

According to at least one embodiment, the graphical representations comprise a chart graphically representing statistical data and a data table containing the statistical data represented in the chart; wherein statistical data selected by a user in the chart is automatically highlighted in the data table. Statistical data selected by a user in one of the graphical representations may also be automatically highlighted in other graphical representations.

The graphical representations may also comprise a process map configured to display the order of one or more process steps; wherein the order of the process steps is modifiable by a user. A step efficiency value may also be displayed in each process step. The interface may also further comprise one or more test variables for use in the quality analysis project steps and the statistical tools of the quality analysis project; wherein the statistical data and test variables used in prior quality analysis project steps and statistical tools are automatically carried forward for use in subsequent quality analysis project steps and statistical tools.

In certain embodiments, the graphical representations comprise a chart illustrating the values of one or more variables ranked in order of their potential influence on a process, with one or more of the variables configured to be removable by a user. The interface may also further comprise one or more user-defined input variables for use in performing the quality analysis project steps, with one or more of the user-defined variables designated by a user as an output variable, an interval input variable, or a categorical input variable.

In at least one embodiment, a regression method is used to determine the relationship between the user-defined variables when one or more user-defined variables are designated as interval input variables. On the other hand, and an analysis of variance (ANOVA) method may be used to determine the relationship between the user-defined variables when one or more of the user-defined variables are designated as categorical input variables.

In many embodiments, the graphical representations comprise a graphical gauge for graphically representing a power value of a statistical test. This graphical gauge may be a "gas gauge" type graph or a slider bar. The interface may also further comprise a factorial experiment design area displayed in the first display area, the factorial experiment design area comprising a first portion for allowing a user to select an experiment type, a second portion for allowing the user to select a factor number and a run number, a third portion for allowing the user to designate an acceptable alpha risk, and a fourth portion for allowing the user to designate a replicate value, a centerpoint value, and a block value. The factorial experiment design area may also further comprise a fifth portion for allowing the user to designate an interaction value and a sixth portion for allowing the user to designate a P limit value.

According to at least one embodiment, the graphical representations comprise a scree plot. The graphical representations may also comprise a fractional factorial display configured to graphically represent the results of a fractional factorial experiment; wherein statistically insignificant results of the fractional factorial experiment are automatically highlighted in the fractional factorial display. In addition, the graphical representations may comprise a first graph illustrating the distribution of a T-test when the actual difference between two population samples is assumed to be less than a pre-determined number, a second graph illustrating the distribution of a T-test when the actual difference between the two population samples is assumed to be more than the pre-determined number, and a third graph illustrating the distribution of a T-test when the actual difference between the two population samples is assumed to be different from the pre-determined number.

The graphical representations may also comprise one or more data boxes containing statistical data from a statistical test, and explanatory statement boxes containing text explaining the significance of the statistical data contained in the data boxes. Still further, the graphical representations may comprise a first process behavior chart for graphically illustrating the value of variables in a single input variable process, and a second process behavior chart for graphically illustrating the value of residuals in a multiple input variable process. The graphical representations may also comprise a first input box for receiving a sample size value, a second input box for receiving a difference value, and a third input box for receiving a power value; wherein the sample size value, the difference value, or the power value of the test is automatically computed and displayed after the other two values are entered by a user.

In at least one embodiment, the graphical representations comprise a process behavior chart generated for a user-selected input variable. The graphical representations may also comprise a capability process behavior chart and a capability histogram simultaneously displayed with the process behavior chart. In addition, the graphical representations may comprise a chart comprising a user-defined upper and lower specification limits illustrating the upper and lower specification limits of a process and upper and lower uncertainty zones configured to graphically display the amount of uncertainty present in a measurement system relative to the width of the upper and lower specification limits.

According to certain embodiments, the graphical representations comprise a final project report, the final project report comprising one or more graphical summaries of each step in the quality analysis project; wherein the final project report is automatically generated upon completion of each in the quality analysis project. The graphical representations may also comprise a single process behavior chart arranged into subgroups; wherein the centerline of each subgroup of the process behavior chart is centered on the subgroup mean.

The graphical representations may also comprise a chart comprising one or more main variable columns graphically representing the magnitude of an effect caused by a main input variable, one or more secondary variable columns blocked within each main variable column and graphically representing the magnitude of an effect caused by a secondary input variable, and a line graph displayed within each main variable column and graphically representing the cumulative sum of the values of each secondary variable column.

In at least one embodiment, a system for displaying graphical representations of statistical data comprises a computer, a quality analysis program having a graphical user interface and capable of being executed by the computer, and a display device controlled by the computer and configured to display the graphical user interface of the quality analysis computer program; wherein the graphical user interface of the quality analysis computer program comprises a first display area for displaying graphical representations of statistical data, and a second display area containing a tree representation of a quality analysis project, the tree representation. The tree representation may comprise one or more quality analysis project steps, one or more statistical tool categories associated with the one or more quality analysis project steps, and one or more statistical tools associated with the one or more statistical tool categories.

In certain embodiments, a method for displaying graphical representations of statistical data comprises providing a first display area for displaying graphical representations of statistical data, and providing a second display area for displaying a tree representation of a quality analysis program. In many embodiments, the tree representation comprises one or more quality analysis project steps, one or more statistical tool categories associated with the one or more quality analysis project steps, and one or more statistical tools associated with the one or more statistical tool categories.

Features from any of the above-mentioned embodiments may be used in combination with one another in accordance with the present invention. These and other embodiments, features and advantages will be more fully understood upon reading the following detailed description in conjunction with the accompanying drawings and claims.

BRIEF DESCRIPTION OF THE DRAWINGS

The accompanying drawings illustrate exemplary embodiments of the present invention and are a part of the specification. Together with the following description, the drawings demonstrate and explain the principles of the present invention.

FIG. 2B is a magnified view of the sidebar display area illustrated in FIG. 2A.

FIG. 3A is an illustration of an exemplary "gas gauge" type graph for graphically representing statistical data according to one embodiment.

FIG. 3B is an illustration of an exemplary "slider bar" type graph for graphically representing statistical data according to an alternative embodiment.

FIG. 12 is an illustration of an exemplary graphical user interface for a data table.

FIG. 20A is an illustration of an exemplary graphical user interface for sorting the results of a test based on an input variable.

Figure 1:
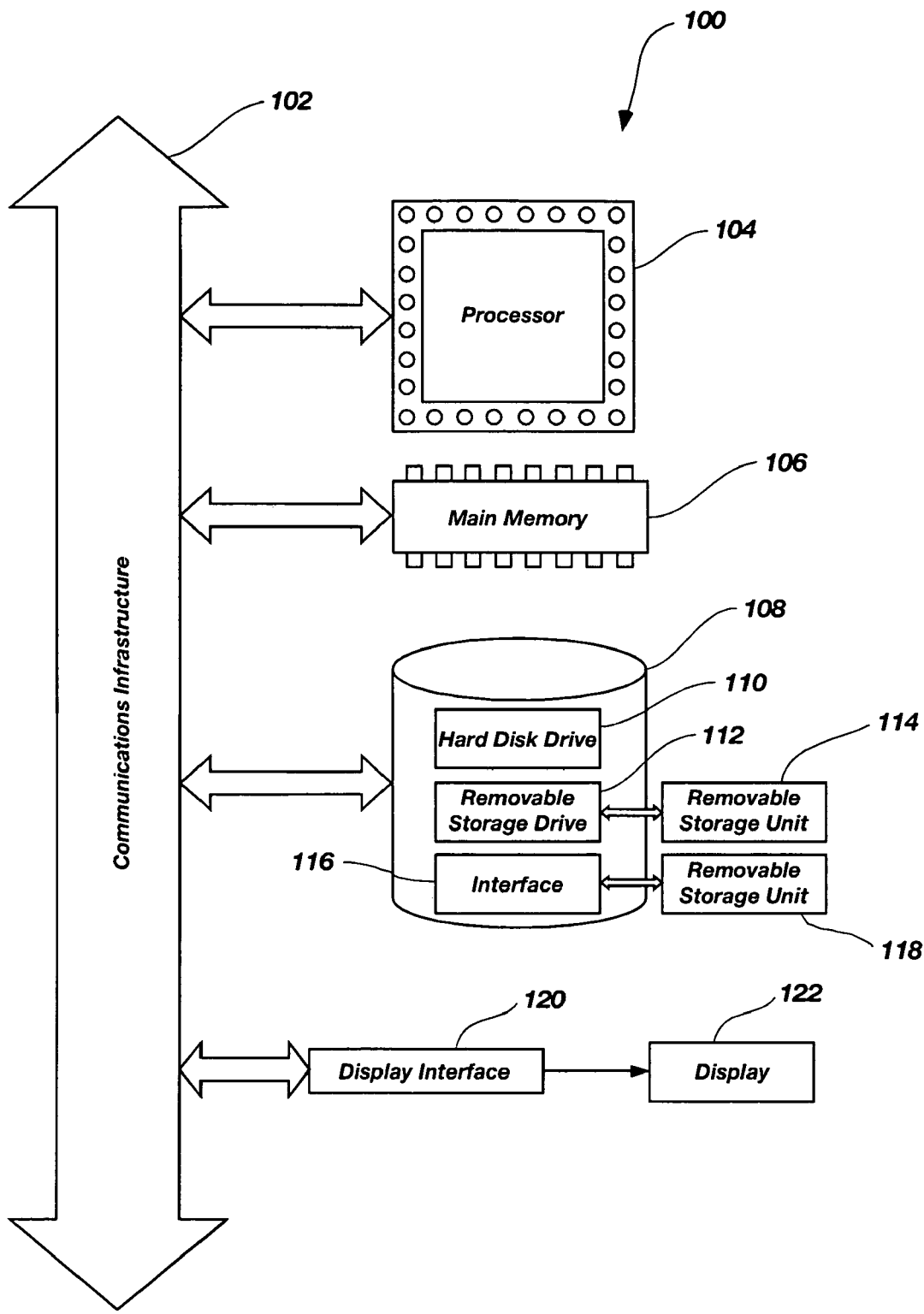
FIG. 1 is a block diagram of the components of an exemplary computer system capable of generating a graphical user interface for a quality analysis computer program.

Throughout the drawings, identical reference characters and descriptions indicate similar, but not necessarily identical, elements. While the present invention is susceptible to various modifications and alternative forms, specific embodiments have been shown by way of example in the drawings and will be described in detail herein. However, one of skill in the art will understand that the present invention is not intended to be limited to the particular forms disclosed. Rather, the invention covers all modifications, equivalents and alternatives falling within the scope of the invention as defined by the appended claims.

DETAILED DESCRIPTION OF PREFERRED EMBODIMENTS

FIG. 1 is a block diagram of the components of an exemplary computer system 100 capable of generating a graphical user interface for a quality analysis computer program. Generally speaking, computer system 100 comprises one or more processors 104 connected to a communications infrastructure 102. As will be appreciated by those of skill in the art, computer system 100 generally represents any single or multi-processor computer or computer system capable of executing single-threaded or multi-threaded applications. Communications infrastructure 102 generally represents any form of structure capable of facilitating communication between one or more electronic components; including, for example, a communication bus, a cross-bar, or a network.

In at least one embodiment, computer system 100 further comprises a main memory 106 and a secondary memory 108 operably connected to processor 104 via communications infrastructure 102. Main member 106 and secondary memory 108 generally represent any form of storage device or medium capable of storing data and other computer-readable instructions. In certain embodiments, main memory 106 is a random access memory (RAM) unit. Secondary memory 108 may also comprise one or more additional storage devices or mediums, including, for example, a hard disk drive 110 and/or a removable storage drive 112.

Removable storage drive 112 generally represents any form of removable storage device capable of communicating with processor 104 via communications infrastructure 102. For example, removable storage drive 112 may be a floppy disk drive, a magnetic tape drive, an optical disk drive, a flash drive, or the like. In certain embodiments, removable storage drive 112 is configured to read from and/or write to a removable storage unit 114 in a manner well known to those of skill in the art. Generally speaking, removable storage unit 114 represents any form of storage device or medium capable of being written to and/or read by removable storage drive 112; including, for example, a floppy disk, a magnetic tape, an optical disk, a flash memory device, or the like. As will be appreciated by those of skill in the art, in at least one embodiment removable storage unit 114 is configured to store therein computer software, data or other computer-readable information.

Secondary memory 108 may also include other similar structures for allowing computer software, data or other computer-readable instructions to be loaded into computer system 100. Such structures can include, for example, a removable storage unit 118 and an interface 116. Examples of suitable configurations of removable storage unit 118 and interface 116 include a program cartridge and cartridge interface, a removable memory chip (such as a flash memory chip, an EEPROM, EPROM, PROM, FRAM, MRAM, or other similar non-volatile memory chip) and associated socket, and other removable storage units 118 and interfaces 116 configured to allow software and data to be transferred from the removable storage unit 118 to computer system 100.

In many embodiments, computer system 100 also includes a display interface 120 that forwards graphics, text, and other data from the communications infrastructure 102 (or from a frame buffer, not shown) for display on a display device 122. Generally speaking, display device 122 represents any form of device capable of visually displaying information forwarded by display interface 120. Examples of display device 122 include CRT monitors, LCD screens, plasma screens, video projectors, and the like.

According to certain embodiments, one or more computer programs (also known as computer software, computer-readable instructions, or computer control logic) may be stored in main memory 106 and/or various portions of secondary memory 108. In addition, although not illustrated in FIG. 1, computer programs may also be loaded into computer system 100 via a communications interface (such as a modem, network interface, communications port, or the like) connected to various external devices. Such computer programs, when executed, enable computer system 100, and more particularly processor 104, to perform the features of the present invention as discussed herein.

As will be appreciated by those of skill in the art, a quality analysis computer program and graphical user interface for the same (discussed in greater detail below) can be implemented as control logic in software, firmware, hardware or any combination thereof. When implemented using software, the software may be stored in a computer-readable medium and loaded into computer system 100 using hard drive 110, removable storage drive 112 or interface 116, or downloaded to computer system 100 over a communications path, such as over the Internet or other network. As used herein, the phrase "computer-readable medium" generally refers to a storage device or medium, such as removable storage units 112, 114 or a hard disk stored in hard disk drive 110, capable of storing a computer program. As detailed above, examples of such media include magnetic media, optical media, flash media, or other recordable media, or media that transmits a carrier wave or other signal. Generally speaking, these computer-readable media represent a manner of providing a computer program (such as a quality analysis computer program) to computer system 100. When executed by processor 104, a computer program loaded into computer system 100 causes processor 104 to perform the functions of the invention as described herein.

Alternatively or in combination therewith, a quality analysis computer program and graphical user interface for the same may be implemented in firmware and/or hardware using, for example, hardware components such as application specific integrated circuits (ASICs). Implementation of a hardware state machine for performing the functions described herein will be apparent to persons skilled in the art.

In at least one embodiment, a graphical user interface for a quality analysis computer program is displayed on display device 122 to provide the user with a convenient, visual mechanism for controlling the operation of computer system 100 and the computer program executed therein. As will be appreciated by those of skill in the art, this quality analysis computer program and graphical user interface for the same may be configured to operate on any type of platform and on any variety of operating system. Generally speaking, to provide input and output functionality, a graphical user interface according to the present invention may include various types of menus and control objects which enable a user thereof to select from available choices. Examples of such control objects include push buttons, via which the user can indicate acceptance of a particular action, radio buttons for selecting one of a number of available choices for a particular parameter, and check boxes for activating or deactivating various features. Other examples of such control objects include scroll bars for displaying different portions of a document within a window, sliders for adjusting variable values, and disclosure triangles for displaying or hiding the contents of a folder or a pop-up menu.

In many embodiments, a user may activate each of these various objects by positioning a cursor on it using a user input device (such as a mouse) connected to computer system 100, and actuating the object, by pushing a button or the like on the user input device. Selection of menu items may occur in a similar manner. For example, the user may position the cursor over the desired command displayed on the menu, and then press or release a control button on the user input device. When this occurs, the operating system of computer system 100 detects the position of the cursor, and if it is located over a menu command or a control object, executes the function associated with the selected command.

As will be appreciated by those of skill in the art, each of these user interface objects has two main properties associated with it; namely, its appearance and its functionality. In general, the functionality of an object relates to the command that is executed by the computer in response to actuating the object. For example, actuating a push button that is labeled "OK" may cause computer system 100 to execute a particular action, such as creating a graphic or chart for display on display device 122. The functionality associated with an object may also include a appearance characteristic in which the object occupies different states in dependence upon user actions. For example, when a push button is actuated or a menu command is selected, the appearance of the object itself, or other objects associated therewith, may change from a normal state to a highlighted state.

As detailed above, in at least one embodiment of the present invention a quality analysis program having a graphical user interface is loaded into computer system 100. A more detailed explanation of various exemplary features of this quality analysis program and its graphical user interface will now be provided with reference to the relevant figures.

Figure 2A:
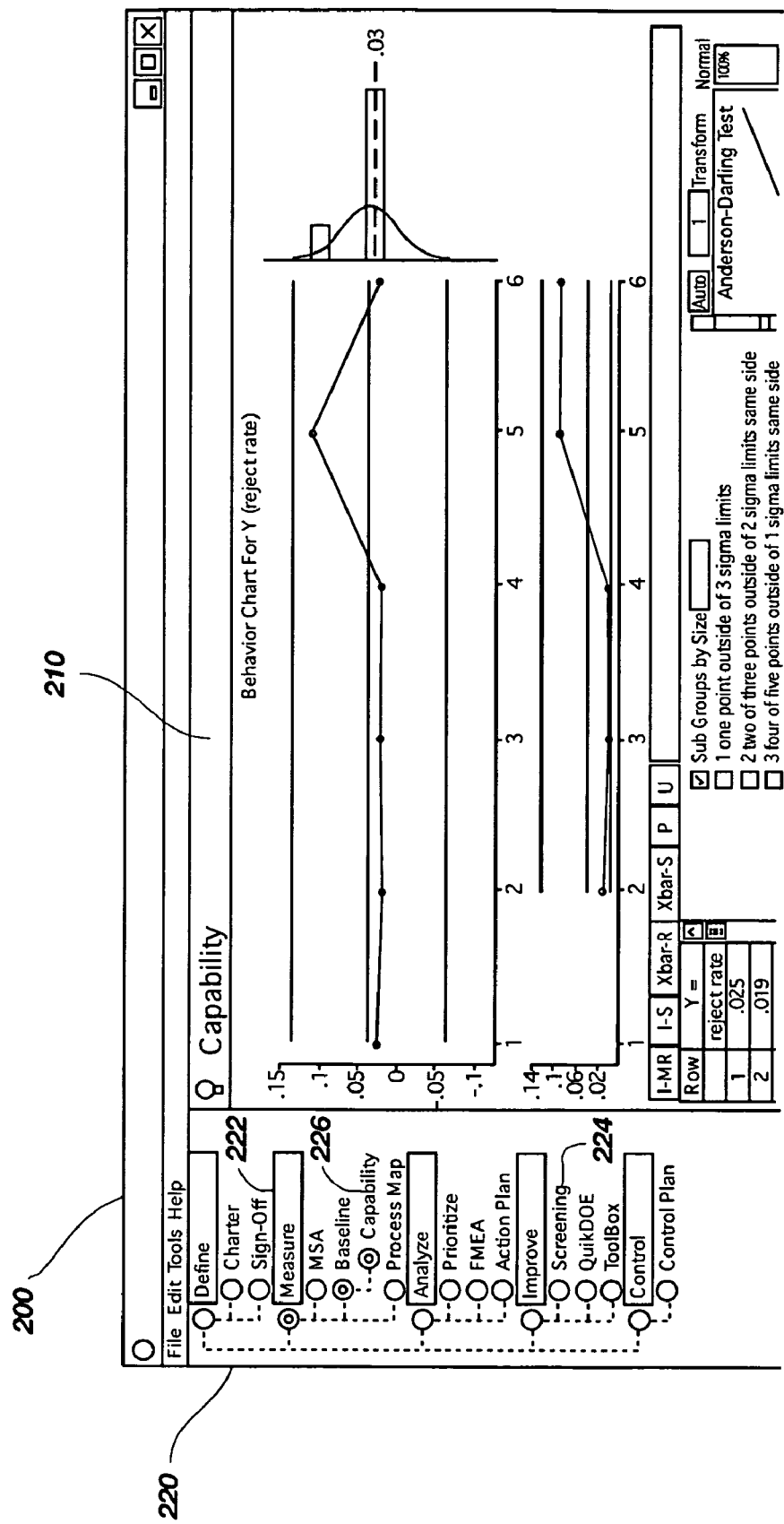
FIG. 2A is an illustration of a main display area and a sidebar display area of a graphical user interface for a quality analysis program according to one exemplary embodiment.

As seen in FIGS. 2A and 2B, a graphical user interface for a quality analysis program according to certain embodiments of the present invention comprises a display area 200 divided into a main display area 210 and a sidebar display area 220. Generally speaking, any number or combination of textual or graphical displays or interfaces may be displayed within main display area 210; including, for example, diagrams, charts, plots, tables, lists, graphs, interfaces for designing statistical experiments, and the like. In at least one embodiment, main display area 210 is configured to display one or more graphical representations of statistical data generated by a quality analysis program. For example, main display area 210 may be used to display one or more of the graphical representations of statistical data illustrated in FIGS. 3-23, each of which will be discussed in greater detail below.

In at least one embodiment, sidebar 220 is designed to display the structure and/or progress of a quality analysis project comprising one or more quality analysis project steps 222. Generally speaking, the number and nomenclature of project steps 222 may be chosen to mirror the project steps used by any one of various quality analysis or improvement tools or programs; including, for example, Six Sigma, Lean, Plan-Do-Check-Act, the Toyota Production System, Total Quality analysis (TQM), and other such tools and programs. In the exemplary embodiment provided in FIGS. 2A-2B, project steps 222 mirror the project steps commonly used in a Six Sigma roadmap; namely, Define, Measure, Analyze, Improve, and Control.

As seen in FIGS. 2A and 2B, sidebar 220 may be designed to display the hierarchical structure and/or progress of a quality analysis project in what is known as a tree view or representation. Generally speaking, the tree view displayed in sidebar 220 visually indicates the level in the hierarchy where each item resides. In at least one embodiment, the tree view displayed in sidebar 220 is comprised of one or more project steps 222 representing the highest or "root" level of the tree representation, one or more tool categories 224 representing one or more "branches" of each project step 222, and one or more tools 226 representing one or more "branches" of each tool category 224. As will be appreciated by those of skill in the art, a "branch" refers to an entry in a tree representation at a particular level. Conventionally, items that are one level in the tree representation below a first object are referred to as the "children" of the first object. Thus, for example, in FIG. 2A the tool category 224 labeled "Prioritize" is a child of the project step 222 labeled "Analyze." In many embodiments, a user may "expand" or "collapse" the tree at various points (i.e., display or hide information in the lower levels) to facilitate viewing of the various hierarchical items.

As seen in FIGS. 2A and 2B, a status indicator 228 may be positioned next to each item in sidebar 220 to indicate the status of each step and sub-step in the quality analysis project. Although status indicators 228 may be of any size or shape, in at least one embodiment status indicators 228 are circular in shape. Generally speaking, status indicators 228 graphically indicate the status of each step and sub-step in the quality analysis project through the use of one or more graphical icons. For example, as seen in FIGS. 2A-2B, when a step or sub-step in the quality analysis project has been completed, a graphic, such as a check mark, may be displayed inside the status indicator 228 positioned next to the completed step or sub-step to indicate that this step or sub-step has been completed. Similarly, a graphic, such as a dot, may be displayed inside status indicator 228 to indicate that a step has been started, but not yet completed (i.e., that the step or sub-step is "In Progress"). Likewise, circular status indicators 228 may be left empty or blank to indicate that a step or sub-step has not yet begun. While one or more of steps 222, categories 224, or tools 226 may be displayed in sidebar 220 at any point, in at least one embodiment only those tools 226 necessary for completion of a project step 222 are displayed. For example, the tool 226 labeled "Capability Study" may only be displayed within sidebar 220 when the project step 222 labeled "Measure" is "In Progress."

According to additional embodiments, when desired, further detailed information about each step or sub-step or the project as a whole may be displayed in main display area 210. For example, a user desiring further detailed information may select a specific step or sub-step using an input device, such as a mouse, to request the display in main display 210 of a detailed report on the selected step or sub-set. Examples of the type of information that may be displayed in this report include, without limitation, information regarding the persons involved in each step, the date and time of completion of each step, the type of savings expected to be generated by each step, the total estimated savings to be gained through the project, grouped by category, and the estimated dates on which these savings will commence.

The simplified tree view and status indicators 228 in sidebar 220 thus enable a user to quickly and easily determine: (1) the number of steps and sub-steps in a quality analysis project; (2) the organization of each step and sub-step in the project; (3) which steps and sub-steps in the project have been completed; (4) which steps are in the process of being completed; and (5) how many steps remain to be completed. Further, a detailed report on each step, sub-step, or the project as a whole may be easily and quickly requested by a user when desired. Sidebar 220 may thus serve to simplify the task of a manager or supervisor in charge of the quality analysis project and assist project leaders in staying on task. Although sidebar 220 has been described and illustrated as a sidebar positioned to the side of main display 210, other configurations are within the scope of this invention. For example, sidebar 220 may be positioned above, below, next to, or within main display 210.

As detailed above, conventional quality analysis tools and programs typically display the output of various statistical tests and experiments as series of data in table format. For example, the following table represents a conventional manner for displaying the results of an exemplary statistical test known as an Analysis of Variance test (also referred to as an ANOVA test):

TABLE 1

| Source | DF | Seq SS | Seq Var | Adj SS | Adj Var | MS Adj | F | VIF | P |
|---|---|---|---|---|---|---|---|---|---|
| Material batch | 4 | 32431 | 82.11% | 32431 | 82.11% | 8108 | 154.9 | 1 | 0 |
| Model | 4 | 32431 | 82.11% | 32431 | 82.11% | 8108 | 154.9 | | 0 |
| Error | 135 | 7067 | 17389% | 7067 | 17389% | 52.35 | | | |
| Total | 139 | 39498 | 100% | 39498 | 100% | | | | |

R-Sq = 82.11%;
R-Sq Adj = 81.58%;
Epsilon-Sq = 82.11%
Tests of Equal Variance:
Levene = 1.529,
P = 0.2;
Bartlett (Normal) = 7.068,
P = 0.13
Y = 58.26 + [data1: 0.7675 data2: 25.7 data3: −9.448 data 4: 2.957 data5: −19.98]

Although a skilled statistician may be able to correctly interpret the results of the exemplary ANOVA test presented in Table 1 with marginal effort, others with only minimal statistical training or experience may struggle to quickly and effectively interpret these results. Accordingly, in at least one embodiment, the results of statistical tests may be visually displayed in main display area 210 in graphical formats that are both easily and quickly interpretable by users having even minimal statistical training or experience.

For example, FIGS. 3A and 3B are illustrations of graphical representations of statistical data that may be displayed in main display 210. As seen in FIG. 3A, in certain embodiments a "gas gauge" type graph 250 may be used to graphically represent the results of a statistical test or experiment. In at least one embodiment, gas gauge graph 250 comprises a first scale 252 and a second scale 254, a pointer 256 and an indicator 258. Generally speaking, scales 252 and 254 may be used to represent the range of possible values for one or more output variables of various statistical experiments or tests, while pointer 256 and indicator 258 indicate the general values of these output variables. For example, in certain embodiments scales 252, 254 may be used to represent the range of values possible for the outputs P (probability value) and $R^2$ (coefficient of determination), respectively, of an ANOVA test. In this exemplary embodiment, the values along first scale 252 run from of 0 to 1.00 (from right to left) to represent the range of possible values for the output P. Similarly, the values along second scale 254 run from 0% to 100% (from left to right) to represent the range of possible values for the output $R^2$.

In certain embodiments, various portions of first scale 252 may be color coded to indicate general ranges of the scale. For example, a portion R nearest the right end of first scale 252 may be colored red, a portion O next to this portion may be colored orange, a portion Y next to this portion may be colored yellow, with the remaining portion G colored green. In at least one embodiment, the junction between portion G and portion Y represents a P value of around 0.10, while the junction between portion O and portion R represents a P value of around 0.05. As known to those of skill in the art, the P value of a statistical test is the probability of getting a value of the test statistic as extreme as or more extreme than that observed when there is no effect in the tested population. In other words, the P value indicates the probability of getting something more extreme than the test's result by chance alone. Conventionally, P values of 0.05 or less are generally interpreted as indicating that the difference caused by the tested variable is real (i.e., not attributable to chance). Accordingly, by color coding various portions of first scale 252, a user may quickly determine whether the difference caused by the variable being studied is real or merely attributable to chance. In particular, so long as pointer 258 is not positioned within or near red portion R, a user may quickly and reliably assume that the difference caused by the tested variable is likely attributable to chance.

The coefficient of determination (commonly designated $R^2$), on the other hand, refers to a percentage of variation in the dependent variable that is "explained" by variation in the independent variable(s). $R^2$ is, thus, a measure of "explanatory power." As such, indicator 258 positioned along second scale 254 serves to indicate the general percentage of variation accounted for by the tested variable. By graphically representing the value of $R^2$ in this simplified manner, second scale 254 and indicator 258 thus enable a user to quickly and intuitively interpret the $R^2$ results of a statistical test or experiment.

Accordingly, by providing a simple and intuitive graphical representation of the output of a statistical test, gas gauge 250 simplifies the interpretation of the results of statistical tests and shortens the amount of time and effort conventionally required to properly interpret these results. Exemplary gas gauge 250 thus enables persons of even minimal skill in the art of statistics to interpret and apply the results of various statistical tests.

Although gas gauge 250 has been described as being used to graphically display the output values of P and $R^2$ from an ANOVA test, persons of skill in the art will appreciate that gauge 250 may also be configured to graphically represent the values or results of any number of other statistical tests or experiments. For example, gas gauge 250 may be configured to graphically represent the power value of a statistical test (as discussed in greater detail below), the results of an equality of variances test, the results of a normality of residuals test, or the like. As is known to those in the art, a "residual" is the value from an original data set after the effects of the variables in this set have been removed.

FIG. 3B is an illustration of exemplary "slider bar" type graphs 260 for graphically representing statistical data according to an alternative embodiment. In the exemplary embodiment illustrated in this figure, slider bar graphs 260 generally comprise a slider scale 262 and a slider bar 264. Similar to scales 252, 254 in FIG. 3A, slider scale 262 represents the range of possible values for one or more output variables of various statistical experiments or tests, while slider bar 264 is used to indicate the actual value of these output variables. Although the range of slider scale 262 may encompass any number of values, in at least one embodiment the values along scale 262 run from 100% to 0% (from top to bottom) to indicate a percentage value.

While slider bar graphs 260 may be used to graphically represent the values or results of any number of statistical tests or experiments, in the exemplary embodiments illustrated in FIG. 3B slider bar graphs 260 are used to graphically represent the results of an equality of variances test and a normality of residuals test. As is well known to those of skill in the art, the equality of variances test and the normality of residuals tests are conventionally performed to confirm the accuracy of assumptions relied upon in various statistical tests. As seen in this figure, slider bar graphs 260 may visually display the percentage of variances that are equal (as determined by an equality of variances test, such as the Levene or Bartlet T-test) or the percentage of residuals deemed "normal" (as determined by a normality of residuals test) by positioning slider bar 264 along slider scale 262.

According to certain embodiments, similar to first slider scale 252 in FIG. 3A, slider scale 262 is divided into one or more color coded regions, such as a green region G, a yellow region Y, an orange region O, and a red region R. In at least one embodiment, the percentage values covered by each region are chosen so as to appropriately indicate the relative likelihood that the assumptions tested by the equality of the variances test and the normality of residuals test have been successfully checked and met. For example, as seen in FIG. 3B, the size of green region G may be chosen so as to cover all percentage values within which an assumption may be deemed to have been satisfied (such as, for example, 100% to 10%). Similarly, the size of red region R may be chosen to encompass all percentage values within which an assumption may be deemed to not have been satisfied (such as, for example, all percentage values less than 5%). These color coded regions help a user to quickly and efficiently identify when the statistical assumptions relied upon have been checked and verified as valid. In particular, in the example illustrated in FIG. 3B, a user need only verify that each slider bar 262 falls within green region G, which indicates that the assumptions have been checked and verified as valid.

Although gas gauge 250 and slider bars 260 have been provided as examples of the types of graphical representations that might be used to visually display and represent the results of various statistical tests and experiments, it will be appreciated that various other graphical representations for displaying these results fall within the scope of the present invention. In particular, persons of skill in the art will appreciate that graphical representations 250, 260 may be modified as needed to correctly and simply display the results of any variety of statistical test or experiment.

Figure 4:
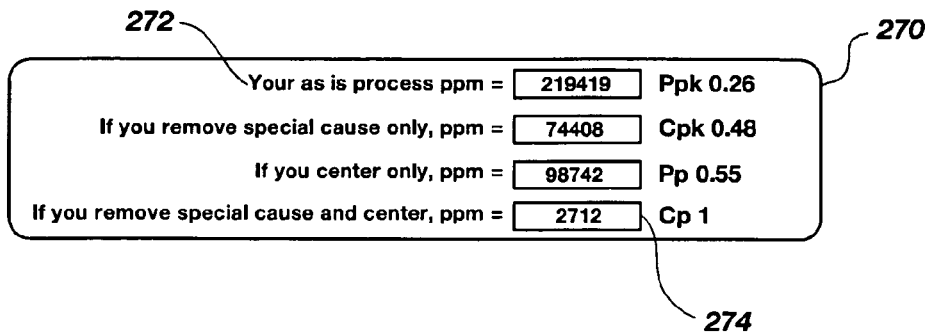
FIG. 4 is an illustration of an exemplary manner for graphically presenting the results of a capability study.

FIG. 4 is an illustration of an additional graphical representation of statistical data that may be displayed in main display area 210. More specifically, FIG. 4 illustrates an exemplary manner for graphically presenting the results of a capability study. As is known to those of skill in the art, four capability indices (namely, Process Capability (Cp), Process Capability Index (Cpk), Process Performance (Pp), and Process Performance Index (Ppk)) are conventionally used in a capability study to determine the quality and capability of a process. Advantageously, these capability indices may also be used to diagnose problems in a process and to predict the number of defective parts that will be produced by this process. In the hands of a skilled statistician, the combined use of these capability indices in a capability study may assist a user in devising a strategy for improving the quality of a process. Considerable skill is, however, typically required to extract a useful process improvement strategy from these four conventional capability indices.

In the exemplary embodiment illustrated in FIG. 4, a capability display area 270 for graphically displaying the results of a capability study comprises one or more explanatory statements 272 and one or more data boxes 274. In at least one embodiment, explanatory statements 272 serve to outline the potential steps of a process improvement strategy for reducing the number of defective parts produced in a process. Similarly, data boxes 274 may respectively contain data relating to each explanatory statement 272. For example, in the exemplary embodiment illustrated in FIG. 4, explanatory statements 272 and data boxes 274 indicate that the process, as it is currently configured (the "as is" process), will produce non-conforming material 21.94% of the time (or 219419 non-conforming parts per million (ppm)). Statements 272 and boxes 274 also indicate that, if a special cause (also known as an extraordinary variation or process shift) is removed from the process, the percentage of non-conforming material produced can be expected to drop to 7.4%. These statements and boxes also indicate that if the process is shifted so that the mean is centered between the specification limits, this percentage can be expected to further drop to 9.8%. If the special cause is removed and the process is centered, statements 272 and boxes 274 indicate that the percentage of non-conforming material will drop to 0.27%.

Since finding and removing the special cause of shifts and trends in a process is usually reasonably straightforward, in at least one embodiment a suggestion to remove special causes is presented as the first explanatory statement 272 following the "as is" explanatory statement. In addition, because a process is unlikely to stay centered until the cause of a shift is removed, the suggestion to center the process is, in certain embodiments, only presented after a suggestion to remove these special causes has been presented to the user. By organizing explanatory statements 272 in this manner, display area 270 thus provides a user with a simple, straightforward and effective strategy for reducing the amount of non-conforming material produced by a process.

Figure 5:
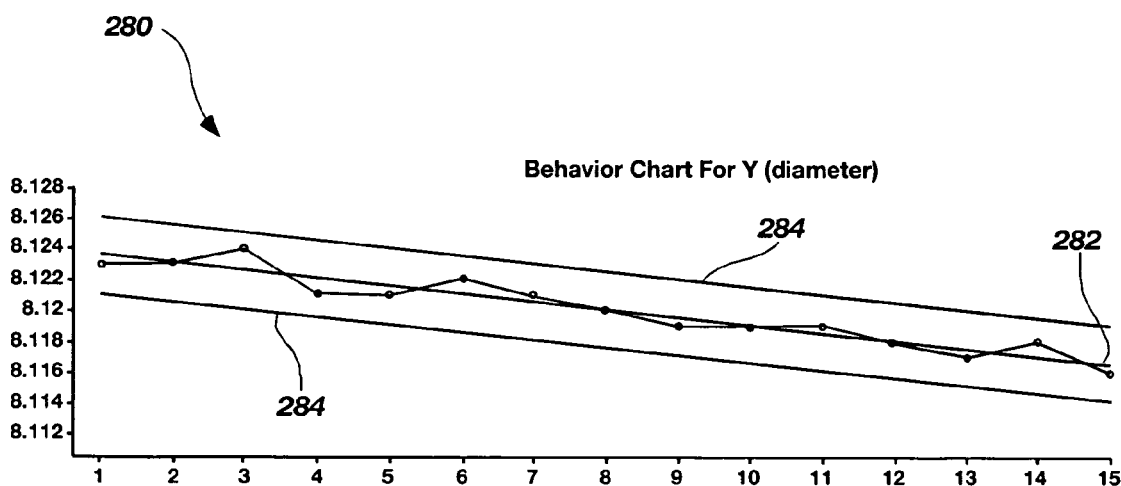
FIG. 5 is an illustration of an exemplary process behavior chart configured to graphically represent trended data.

FIG. 5 is an illustration of an additional graphical representation of statistical data that may be displayed in main display area 210. More specifically, FIG. 5 is an illustration of an exemplary process behavior chart configured to graphically represent trended data for display in main display area 210. Generally speaking, many processes exhibit a trend that is a natural part of the process. For example, the largest hole a drill bit will ever drill is the first one it drills. As the bit ages and material is slowly ground away, the bit shrinks and the holes it drills become smaller. Accordingly, a time series representation of the hole size drilled by this bit will exhibit a natural trend of gradually reduced hole sizes.

In the exemplary embodiment illustrated in FIG. 5, a trended behavior chart 280 comprises a trendline 282 serving as a centerline of chart 280 and two parallel limit lines 284 having the same slope as and positioned to surround trendline 282. While the centerline in conventional process behavior charts is typically drawn parallel to the horizontal axis of the chart, trendline 282 serving as the centerline of chart 280 may be drawn with a slope that follows an identified process trend. In at least one embodiment, trendline 282 is only drawn with a slope that follows the identified trend after the trend has been verified as real (i.e., a trend that is not attributable to chance), as determined by methods well known to those of skill in the art. Once the trend has been verified as real, the slope of trendline 282 may be sloped in accordance with this trend. Parallel limit lines 284 may also be drawn to have the same slope as trendline 282, instead of merely providing limit lines that are drawn parallel to the horizontal axis of the chart.

Because conventional process behavior charts and control charts fail to account for process trends, a user may incorrectly identify a data point as falling outside of a specification limit when, in reality, the objectionable data point may fall within the accepted limits of a process trend. Thus, because the slopes of centerline 282 and limit lines 284 may be drawn to follow that of a real process trend, chart 280 enables a user to quickly and correctly determine whether data points in a trended data set fall within the required limits (as indicated by limit lines 284). Further, because the slopes of trendline 282 and limit lines 284 are only sloped to follow the slope of an identified process trend once the trend has been verified as real, a user viewing chart 280 can be confident that the trended slope in chart 280 is accurately and appropriately represented.

Figures 6A, 6B:
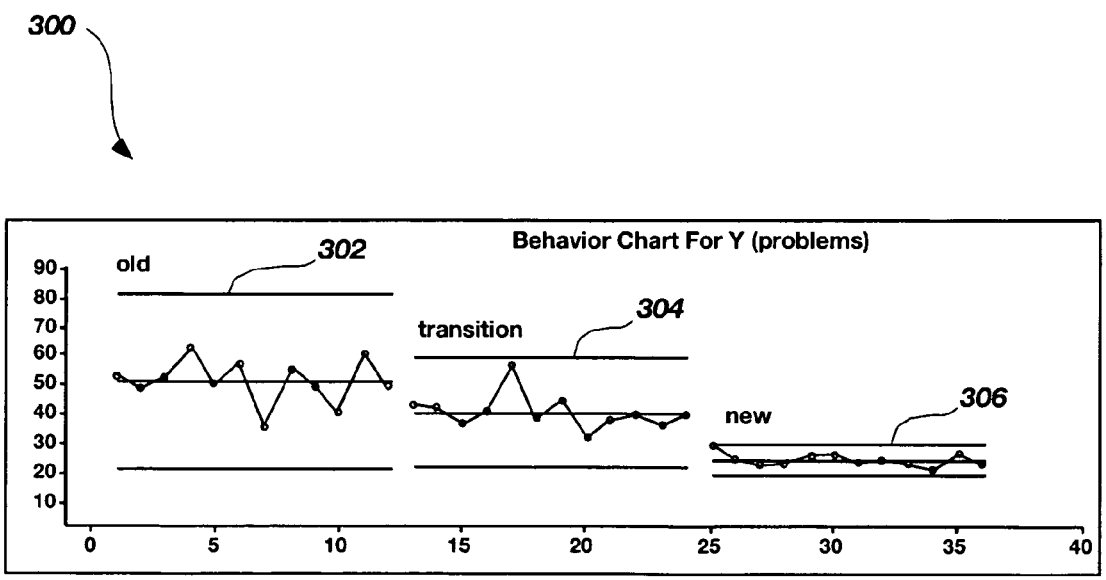
FIG. 6A is an illustration of an exemplary graphical interface for splitting a process behavior chart.
FIG. 6B is an illustration of an exemplary process behavior chart split in accordance with the values input by a user in the interface illustrated in FIG. 6A.

FIG. 6A is an illustration of an exemplary graphical user interface for splitting a process behavior chart. When a process is undergoing change, it is common practice to split a process behavior chart relating to this changing process into segments corresponding to the various stages of the changing process. Splitting a process behavior chart in this manner enables a user to quickly and simply evaluate the output of the stages of the changing process independent from one another. For example, as illustrated in FIG. 6B, a behavior chart illustrating the output of a process may be split into three segments representing the output of the process prior to a change in the process (the "old" process), during a change in the process (the "transition" period), and after a change in the process has occurred (the "new" process). FIG. 6A is an illustration of an exemplary, simplified graphical user interface 290 for allowing a user to split a process behavior chart in this manner.

As seen in FIG. 6A, a user may request the creation of a split behavior chart by using a user input device, such as a mouse, to check selection box 292. In at least one embodiment, some form of explanatory label, such as the "Chart Split" label illustrated in FIG. 6A, is displayed next to selection box 292 to indicate its function. Once selection box 292 has been checked, the user may be prompted to specify the beginning point of each desired segment and a name for each segment. A chart similar to exemplary chart 300 in FIG. 6B may then be generated.

FIG. 6B is an illustration of an exemplary process behavior chart segmented or split in accordance with the values input by a user in the interface illustrated in FIG. 6A. As seen in this figure, exemplary chart 300 comprises a first segment 302, a second segment 304, and a third segment 306. In general, the beginning points and names of each of these segments correspond to the values entered by the user in data boxes 294 of interface 290. For example, second segment 304 in FIG. 6B is labeled "transition" and begins at data point 13 in accordance with the values specified in data boxes 294. Interface 290 thus enables a user to quickly and easily split a process behavior chart into one or more desired segments, as illustrated in FIG. 6B.

Figures 7A, 7B:
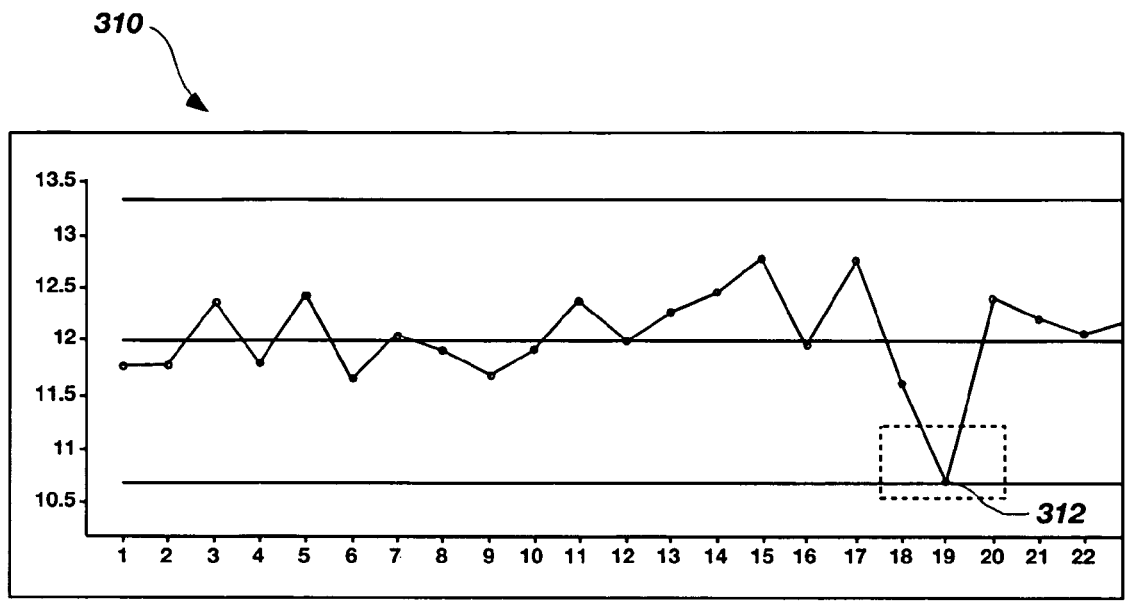
FIG. 7A is an illustration of an exemplary process behavior chart having one data point graphically selected by a user.
FIG. 7B is an illustration of a data table having a highlighted data point value corresponding to the data point selected in FIG. 7B.

In certain embodiments, a user may desire to more closely examine or otherwise manipulate the underlying data relating to a data point or points graphically displayed in a chart or graph displayed in main display area 210. This may be accomplished in the quality analysis program and graphical user interface of the present invention in many ways. For example, as illustrated in FIG. 7A, a user may "lasso" or otherwise select a data point, such as data point 312 in chart 310, using a user input device (such as a mouse) connected to computer system 100 in a manner well known to those of skill in the art. The underlying data corresponding to the selected data point or points may then be highlighted, flagged or otherwise emphasized in a data table containing the data relating to the process. For example, as illustrated in FIG. 7B, a data value 317 in data table 315 corresponding to selected data point 312 in chart 310 may be flagged, highlighted or otherwise emphasized to indicate that this data value corresponds to the data point selected by the user. The highlighted or flagged data value 317 in data table 315 may then be further examined or manipulated by the user using various tools of a quality analysis program. For example, the user may omit the selected data point 312 and data value 317 from graph 310, or may leave data point 312 in graph 310 but omit data value 317 from further calculations, such as the calculation of the centerline and natural process limits of graph 310. By highlighting or flagging the underlying data corresponding to a selected data point in this exemplary manner, the graphical user interface of the present invention enables a user to quickly and easily identify and further manipulate various points of graphically displayed data.

Figure 8:
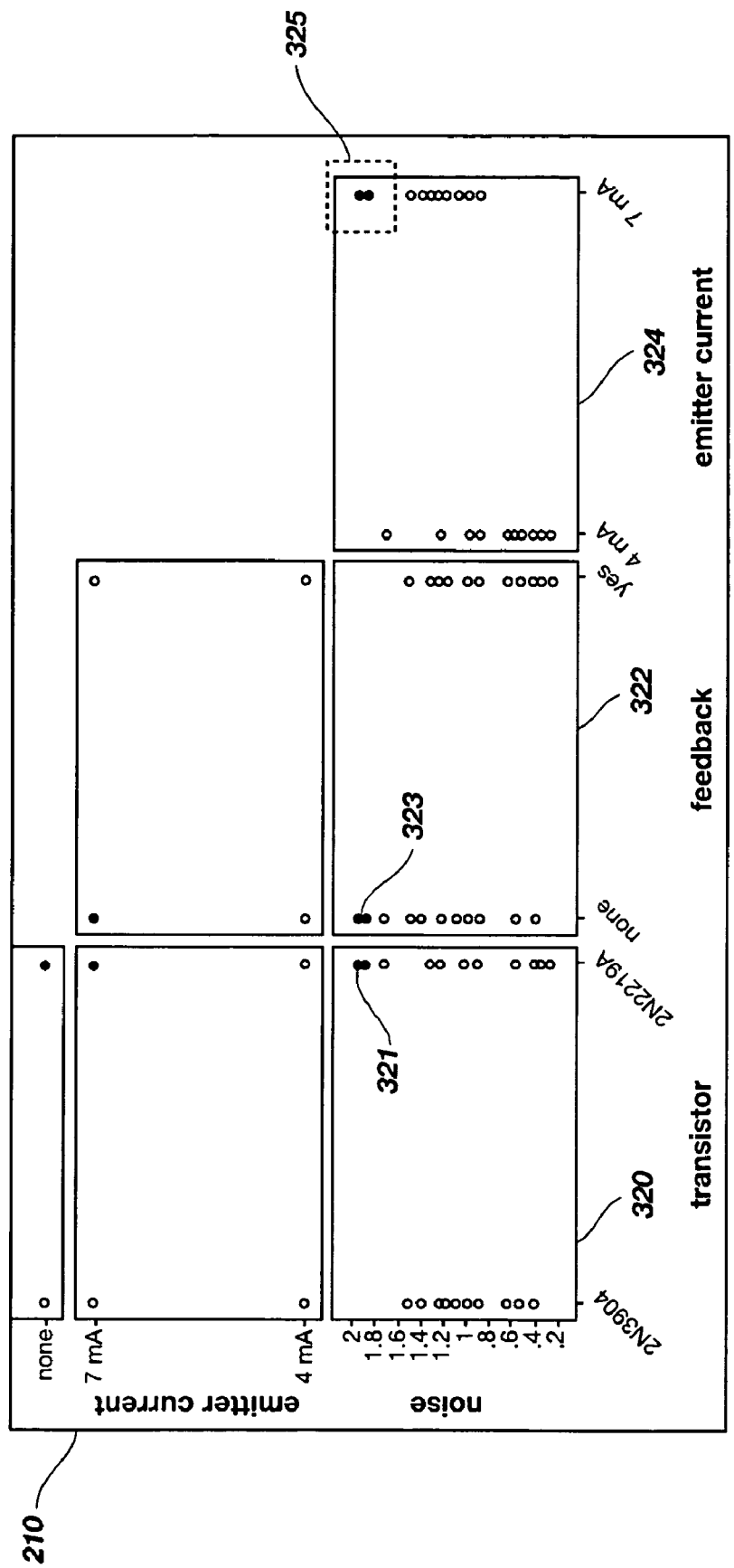
FIG. 8 is an illustration of an exemplary manner for graphically highlighting a data point selected by a user in a first display in other displays.

Similarly, in many embodiments of the present invention, when data points are selected in a first graphical representation by a user, these same data points may be highlighted, colored, flagged, or otherwise emphasized in subsequent graphical representations. For example, as seen in FIG. 8, a group of data points 321, 323 respectively displayed in first and second plots 320, 324 may be highlighted, colored, flagged, or otherwise emphasized to indicate that these data points correspond to the data points 325 "lassoed" or otherwise selected by a user in a third plot 324 using a user input device (such as a mouse). In this example, the results of a three-way factorial experiment are displayed in FIG. 8, with noise as the output variable and transistor type, feedback, and emitter current as the input variables. By highlighting, coloring, or otherwise emphasizing the data points that correspond to the selected data points 325 in plot 324, the user can quickly and easily see that the noise that occurred when 7 mA of emitter current was applied also occurred with no feedback (as illustrated by points 323 in plot 322), and with the 2N2219A transistor (as illustrated by points 321 in plot 320). Accordingly, this feature allows a user to quickly and correctly identify and analyze data points across a number of graphical representations.

Figure 9:
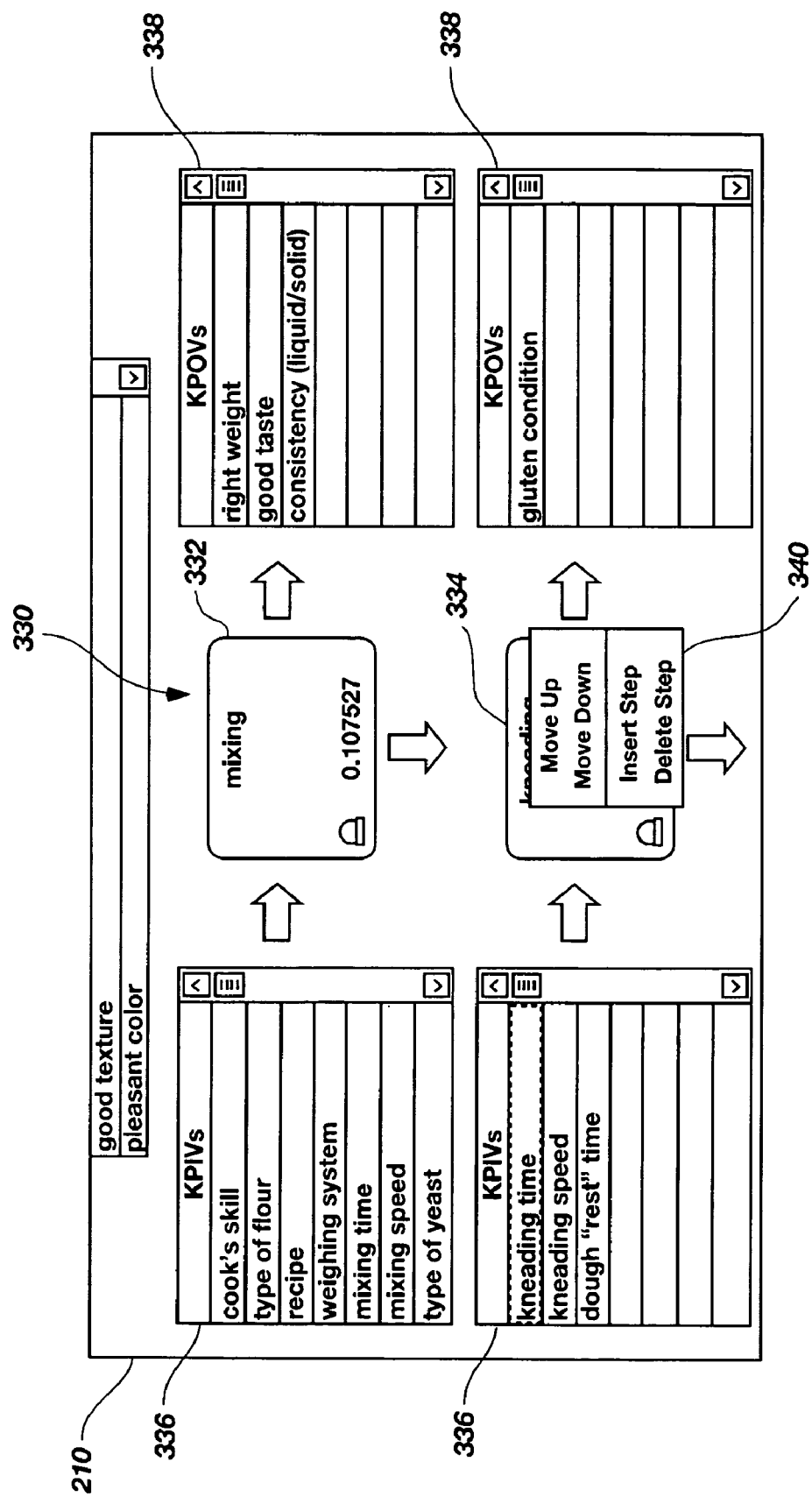
FIG. 9 is an illustration of an exemplary graphical user interface for a dynamic process map.

FIG. 9 is an illustration of an exemplary graphical user interface for a dynamic process map. In at least one embodiment, a dynamic process map 330 comprises one or more process steps 332, 334 representing the general flow of a process. In many embodiments, one or more user-defined Key Process Input Variables (KPIVs) are categorized in input boxes 336 as inputs in the process, while one or more user-defined Key Process Output Variables (KPOVs) are categorized in output boxes 338 as outputs of the process. As illustrated in FIG. 9, the arrangement and number of the process steps in process map 330 may be dynamically manipulated by a user as desired. For example, in certain embodiments the order of a process step (such as process step 334) may be altered by a user by selecting the step using a user input device (such as by right-clicking the step using a mouse). A dialog box, such as dialog box 340, containing a number of actions that may be performed on the selected step may then be displayed in proximity to the selected step. A user may then manipulate the selected step by selecting one of the actions displayed in dialog box 340. In certain embodiments, this configuration enables a user to move a step up or down within process map 330, delete the step from the process, or add a new step to the process, although many other actions are conceivable. This exemplary configuration thus enables a user to quickly and easily manipulate and dynamically arrange the steps in process.

Figure 10:
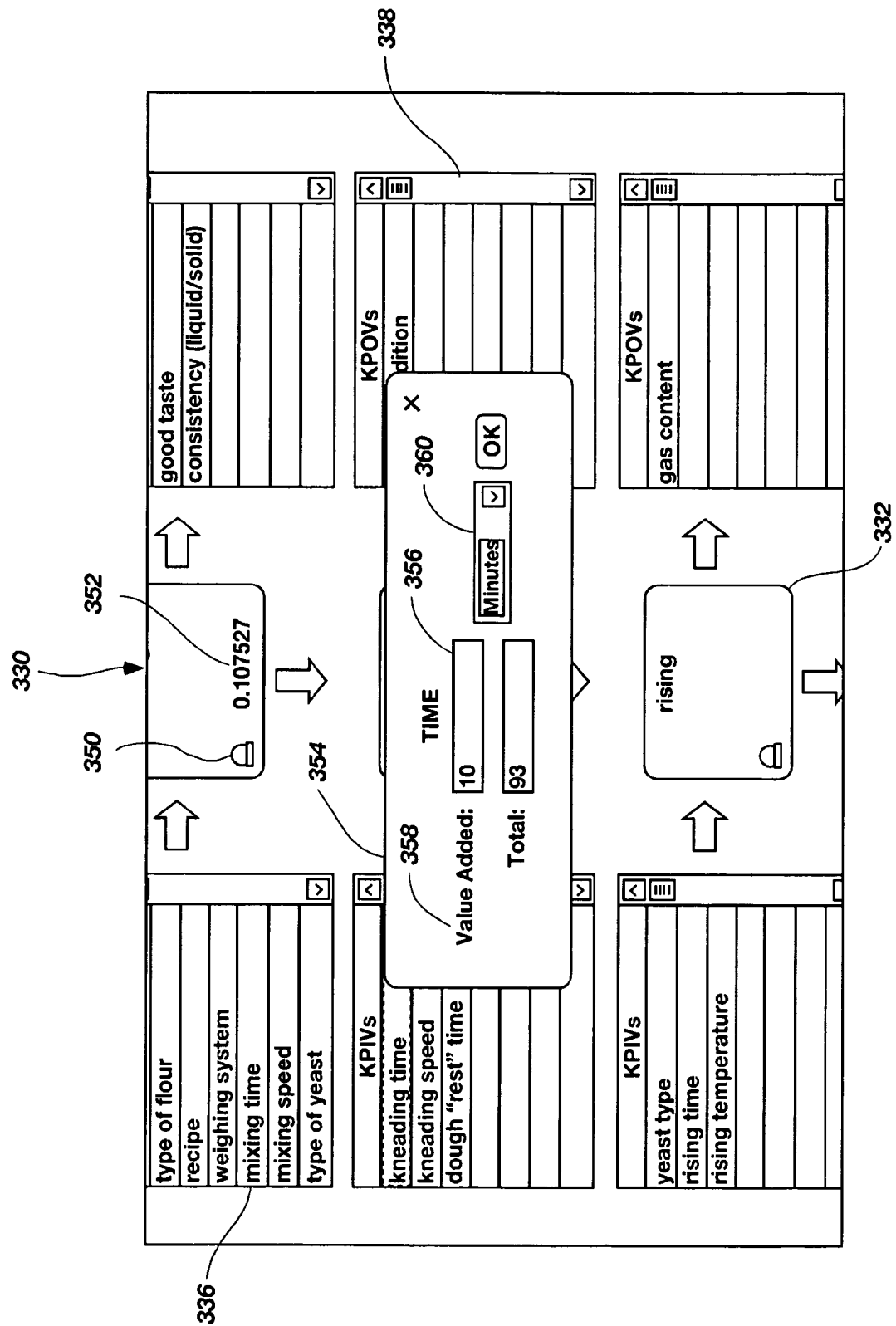
FIG. 10 is an illustration of a step efficiency value incorporated into a process map.

FIG. 10 is an illustration of an exemplary process map 330 incorporating a step efficiency value. In the exemplary embodiment illustrated in this figure, a step efficiency icon 350 and a step efficiency value 352 are incorporated into and displayed within each step 332 in process map 330. In at least one embodiment, step efficiency value 352 numerically represents the efficiency of the step in terms of the value it adds to the process as a whole. More specifically, step efficiency value 352 numerically indicates whether the time spent in performing the selected step is appropriate in light of the value ultimately added by this step to the process as a whole, as determined by the user.

In at least one embodiment, the values necessary for computing step efficiency value 352 are entered by a user in an efficiency input interface 354. Generally speaking, efficiency input interface 354 comprises one or more input boxes 356 positioned next to one or more explanatory labels 358. To enter the required values, a user may select step efficiency icon 350 using a user input device, such as a mouse, which triggers the display of efficiency input interface 354. The user may then input the desired values for the "Value Added" time and the "Total" time in input boxes 356 using a user input device, such as a keyboard. In general, the "Value Added" is a theoretical value representing the amount of time to be allotted for completing the step in light of the value the step contributes to the process as a whole. In at least one embodiment, the "Value Added" time is assigned by a user by evaluating the value of the process, versus the value of the process as a whole, using methods known to those of skill in the art. On the other hand, the "Total" time is the actual amount of time currently required to complete the step. Once these values have been entered by the user, step efficiency 352 may then be automatically computed by dividing the "Value Added" time by the "Total" time of the process. As the "Total" time required to complete a step decreases, step efficiency value 352 increases, indicating an increase in efficiency.

Displaying step efficiency value 352 in process map 330 in this manner thus enables a user to quickly and efficiently determine the relative time to be allocated to each step in a process. Advantageously, by incorporating a step efficiency value 352 into process map 330 in this manner, the design and flow of a process map may be simplified and the relative value of each step in this process may be easily determined.

Figure 11:
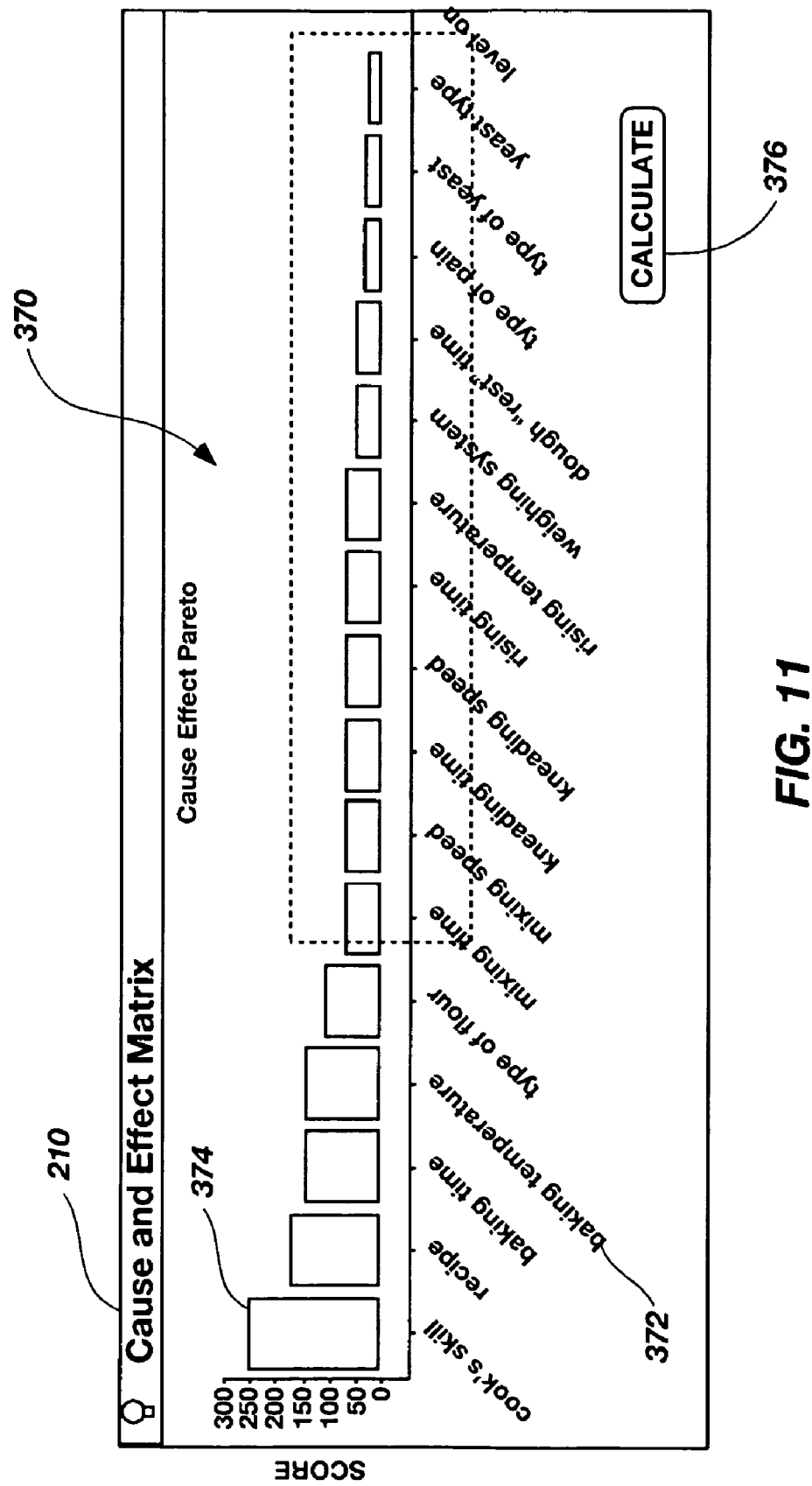
FIG. 11 is an illustration of an exemplary cause and effect Pareto diagram.

FIG. 11 is an illustration of an additional graphical representation of statistical data that may be displayed in main display area 210. As seen in this figure, an exemplary cause and effect Pareto 370 chart may comprise one or more columns 374 vertically extending above one or more Key Process Input Variables (KPIVs) 372 positioned along the chart's horizontal axis. In general, chart 370 graphically represents the strength of the influence that each input variable 372 is likely to have on a process. The strength of an input variable's influence is generally determined based on a score computed using a cause and effect matrix, as is known to those of skill in the art. The higher the score, the more influence the input variable is likely to have. To help a user of the quality analysis program quickly and easily determine the most influential input variables, the score of each input variable 372 may be graphically represented by columns 374 in chart 370, sorted from largest to smallest.

As seen in FIG. 11, similar to the graphical representation in FIG. 7A, a user may "lasso" or otherwise select one or more input variables 372 in chart 370 using a user input device, such as a mouse. The selected input variables 372 may then be removed from consideration or merely flagged by pushing a button on the user input device. In at least one embodiment, chart 370 is automatically generated and displayed in main display area 210 once the score for each input variable 372 has been computed. In other embodiments, chart 370 is generated and displayed when a user selects push button 376 using a user input device.

FIG. 12 is an illustration of an exemplary graphical user interface for a data table. In at least one embodiment, an exemplary data table 380 containing the data values of one or more variables from one or more statistical experiments is displayed in main display area 210. Data table 380 may comprise one or more column headings 382 and one or more row headings 384. While row headings 384 may be labeled or designated in any number of manners, in at least one embodiment each row heading 384 is labeled to correspond to a run in a multi-run statistical experiment.

As is well known to those of skill in the art, the type of statistical test that is appropriate for a particular situation depends, to a great degree, on the types of variables to be tested. For example, if a user desires to run an experiment to determine the relationship between an input variable and an output variable when both variables are interval/ratio type intervals, a regression-type statistical experiment should be performed. Similarly, if more than one interval/ratio type input variable is to be investigated, then multiple linear regression experiments are required. When, however, the input variable is categorical and the output variable is of the interval/ratio type, then an ANOVA test is necessary. In addition, when multiple categorical input variables are of interest, then a multi-variate ANOVA test is required.

To aid in the selection and application of appropriate statistical tools, in at least one embodiment data table 380 allows a user to designate the type of variable contained in each column in table 380. In particular, a user may designate whether a column of variables is to be designated as: (1) an output variable (Y variable); (2) an interval/ratio input variable (X variable); or (3) a categorical input variable (Xc variable), each of which is well known to those in the art. Generally speaking, a user may designate these variable types in any number of ways. For example, a user may designate the type of variable contained in each column by selecting a column heading 382 using an input device (such as a mouse) and by selecting one of the options displayed in a pop-up menu 386. In the exemplary embodiment illustrated in FIG. 12, the input variable type "Xc" has been selected in pop-up menu 386, indicating that the column labeled "Soil Type" has been designated as a categorical input variable.

By allowing a user to designate the variable type for each column in data table 380, the process of selecting the appropriate statistical tool for the experiment may be simplified and automated. For example, when one or more input variables in data table 380 are designated "X" (representing an interval/ratio input variable), further analysis and experiments performed on this data may automatically be treated as regression-type problems. Further, when one or more input variables in data table 380 are designated "Xc" (representing a categorical input variable), further analysis and experiments performed on this data may automatically be evaluated using ANOVA. If both types of input variables are chosen, then a model that allows both regression-type and ANOVA analysis at once, as is known in the art, may be automatically selected.

Figure 13:
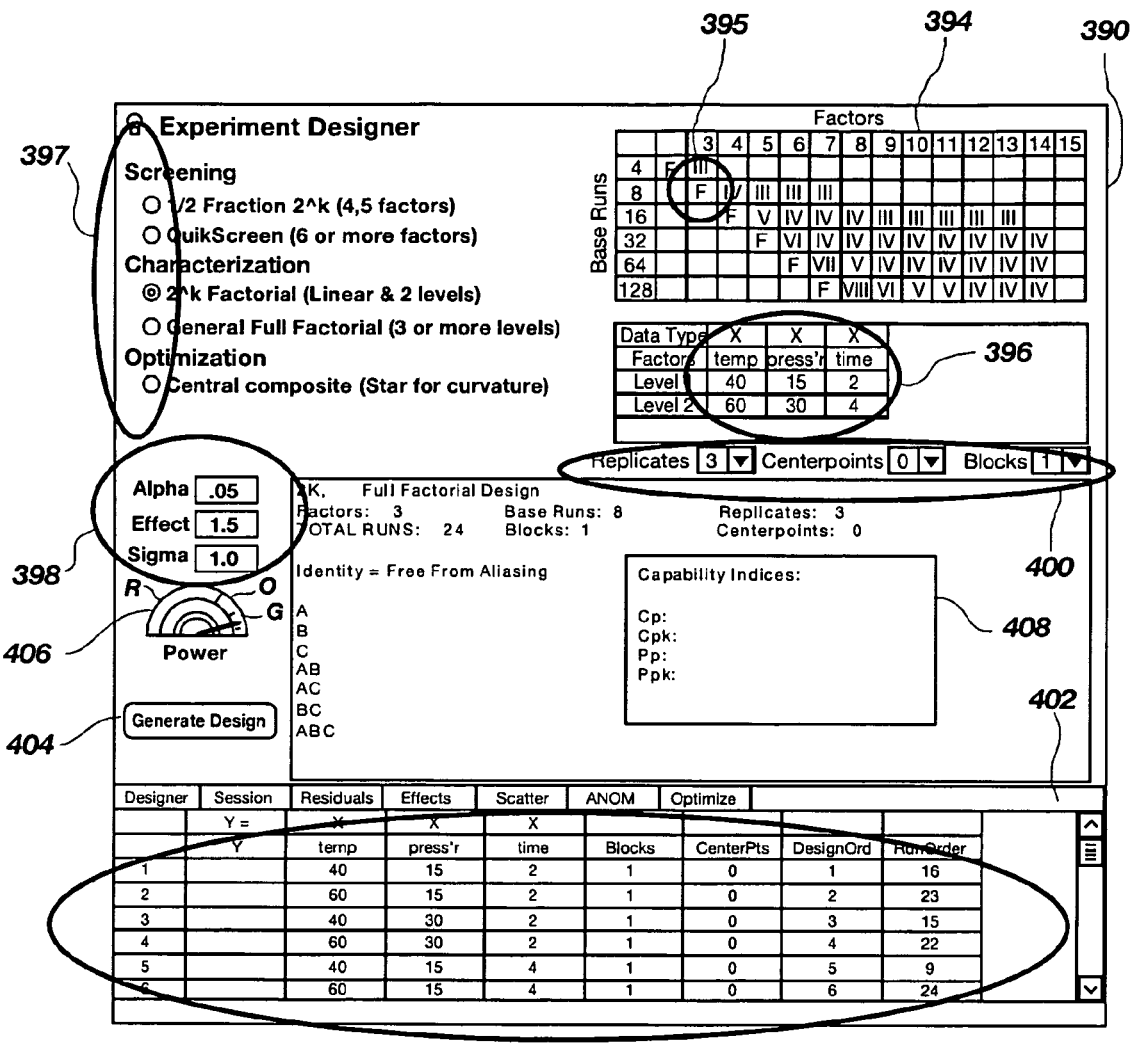
FIG. 13 is an illustration of an exemplary graphical user interface for factorial experiment design.

FIG. 13 is an illustration of an exemplary graphical user interface for the design of factorial experiments. In certain embodiments, a factorial experiment design interface 390 capable of being displayed in main display area 210 generally comprises one or more feature selection regions and an output table 402. In the exemplary embodiment illustrated in FIG. 13, interface 390 comprises a first feature selection region 392, a second feature selection region 394, a third feature selection region 396, a fourth feature selection region 398, and a fifth feature selection region 400. In first feature selection region 392, a user may select the type of experiment to be run by selecting from one or more options displayed in region 392 using a user input device, such as mouse. Although many choices may be displayed in first feature selection region 392, in at least one embodiment the user may select from the following options: (1) a ½ faction $2^K$ screening operation; (2) a six or more factor screening operation; (3) a $2^K$ factorial experiment; (4) a full factorial experiment; and (5) a central composite optimization operation.

In second feature selection region 394, the user may point to and select a cell in the table that corresponds to the number of factors to be investigated and the number of runs to be performed per replicate. In this example, a selected cell 395 corresponds to three factors and eight runs per replicate, which is a fully crossed design (as indicated by the letter "F" in selected cell 395). As known to those of skill in the art, a fully crossed design means that all possible combinations will be checked. The resolution of cells that correspond to designs that are less than fully crossed are indicated by other roman numerals, such as, for example, I, II, III, IV, and V.

In third feature selection region 396, the number of factors (input variables) selected in second feature selection region 394 (three in this case) are displayed in a grid. The names of each of these input variables may be designated, as desired, by the user using a user input device (such as a mouse and a keyboard). In addition, the values for each of these input variables may be designated by the user, as desired.

In fourth feature selection region 398, the user may enter an acceptable alpha risk ("Alpha," often 0.05, as known in the art), the minimum effect that is of interest ("Effect"), and an estimate of the standard deviation of the process ("Sigma"). As discussed in greater detail below, these input values may be used in calculating the "power" of an experiment. In fifth feature selection region 400, the user may specify the number of blocks or centerpoints to be included in the experiment. The user may also add replicates as desired. As is known to those of skill in the art, the higher the number of replicates is, the higher the "power" of the experiment and the more likely the experiment will be able to accurately detect change (if present) in a process.

Once the user has specified all necessary inputs, the designed test may be generated by selecting pushbutton 404, which, in certain embodiments, is labeled "Generate Design." The correct combinations of input variables to carry out the experiment may then be automatically computed and displayed in output display 402. Simplified interface 390 thus allows the user to design and generate a statistical test or experiment using a minimal number of steps displayed on a single page. This exemplary design of interface 390 thus decreases the complexity involved in convention experiment design programs, resulting in increased interpretability and time savings.

In at least one embodiment, exemplary experiment design interface 390 also comprises a gas gauge type graph 406 for graphically representing the results of a statistical test or experiment. Similar to gas gauge graph 250, in certain embodiments gas gauge graph 406 comprises a scale and a pointer, as illustrated in FIG. 13. In addition, various portions of the scale in graph 406 may be colored coded to generally represent various statistical values. For example, a right hand portion G of the scale may be colored green, a portion Y next to this portion may be yellow, with the remaining portion R colored red. Configured in this manner, gas gauge 406 may be used to graphically represent various statistical data; including, for example, the "power" of a statistical test. As known in the art, the "power" of a statistical test, such as a factorial experiment, is the probability of detecting change (if present) in a process. In at least one embodiment, interface 390 and gas gauge graph 406 are used to compute and display the power of a process prior to performing the test to help a user determine whether enough, but not too many, resources have been dedicated to the test to ensure its accuracy and reliability.

According to certain embodiments, the power of a test is computed based on inputs supplied by a user in interface 390. In particular, the power of a test may be computed, using methods well known to those of skill in the art, based on the "Alpha," "Effect," and "Sigma" values entered in fourth feature selection region 398, the number of factors and base runs specified in second feature selection region 394, and the number of replicates, centerpoints, and blocks specified in fifth feature selection region 400. While the value of the power computed in this manner may be numerically displayed in output display 402, in at least one embodiment this power value is graphically represented using gas gauge 406. In particular, gas gauge 406 may be used to quickly and simply indicate whether the computed power value of the statistical test to be performed is high enough to ensure the test's accuracy and reliability. For example, in at least one embodiment gas gauge 406 may be configured such that when the computed power value indicates a sufficiently high beta-1 probability of detecting change (if present) in a process, the pointer in gauge 406 is positioned within green portion G. Similarly, gas gauge 406 may be configured such that when the computed power values indicates that there is a low likelihood that the test will be able to accurately detect a change when present, the pointer in gauge 406 may be positioned within red portion R. By examining gas gauge 406, a user may thus be able to quickly and easily determine whether the designed experiment exhibits a sufficient power value to be accurate and reliable.

Still further, the graphical representation of the power value in gas gauge 406 may be automatically and dynamically generated based on the user's entries in interface 390. In other words, in at least one embodiment the power value of the test to be performed may be computed and displayed in graph 406 as each value is entered by the user in interface 390. For example, upon entry of the number of replicates desired in feature selection region 400, the power value of the test may be computed based on this value and displayed in graph 406. As various values in interface 390 are changed, the pointed in graph 406 may change position accordingly to indicate the resulting change in power. In many embodiments, this exemplary and simplified configuration enables a user to quickly and easily determine the variable values and combinations that will result in a sufficiently high power value. For example, since, as is known in the art, an increase in the number of residuals results in increased power values, a user may gradually increase the number of residuals selected in feature selection region 400 until the pointer in gas gauge graph 406 falls safely within the green portion G of the scale.

In addition, in at least one embodiment the values of the four capability indices Cp, Cpk, Pp, and Ppk may be generated and displayed in main display 210 as an additional output of a factorial experiment designed using interface 390 in FIG. 13. As is well known to those in the art, four inputs are required to calculate the four capability indices discussed in connection with FIG. 4 above; namely, the specification limits of the process, the mean of the process, the standard deviation of the process as determined by the sum of squares method, and the standard deviation of the process as determined by the moving range method. Although these four inputs and indices are conventionally generated and calculated as part of a discrete statistical test, in at least one embodiment these capability indices (namely, Cp, Cpk, Pp, and Ppk) are calculated as an output of and in conjunction with another statistical test, such as a factorial experiment. As known by those of skill in the art, factorial experiments are commonly used to test each variable in a multi-interaction environment to determine whether the tested variable has a real influence on the process as a whole or not. Factorial experiments also predict the mean of the output variable for each possible combination of factors (also known as states).

In computing these capability indices, in at least one embodiment the mean of the output variable predicted by the factorial experiment designed in FIG. 13 for each of a desired number of possible combinations serves as the first input for a capability index. In addition, because the specification of a process and the standard deviation of the process (as determined by the sum of squares method and the moving range method) are either available or readily ascertainable using known methods, the second, third and fourth inputs necessary to calculate the four capability indices may be provided. Thus, in accordance with at least one embodiment, the values of the four capability indices Cp, Cpk, Pp, and Ppk may be generated and displayed in an index output box 408 as an additional output of a factorial experiment designed using interface 390.

As will be appreciated, this exemplary configuration enables a user to make a reasonable prediction of process capability as part of a factorial experiment before a process is set up or changed. This saves the time and expense associated with generating and measuring additional samples to estimate the capability indices. In addition, since, as known to those in the art, Cpk is relatively insensitive to non-homogeneity while Ppk is sensitive, a user may compare the values of Cpk and Ppk derived from residuals, to obtain a useful numerical estimate of the degree of homogeneity of the residuals.

Figure 14:
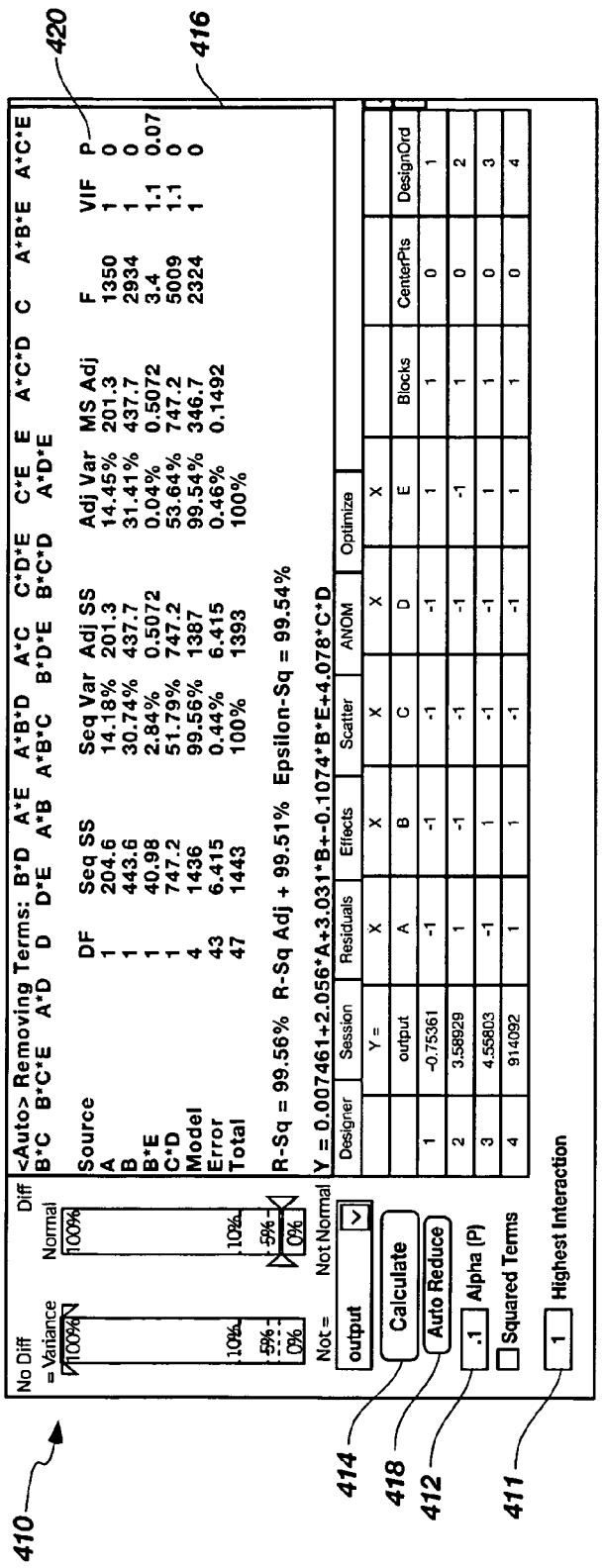
FIG. 14 is an illustration of an exemplary graphical user interface for the automatic reduction of insignificant variables in an experiment.

FIG. 14 is an illustration of an exemplary graphical user interface 410 for enabling a user to automatically reduce insignificant variables in an experiment. In at least one embodiment, exemplary interface 410 comprises an interaction selection region 411, an alpha selection region 412, pushbuttons 414 and 416, and an output display 416. While this interface may generally be configured to perform any number of statistical tasks, in certain embodiments this interface is configured to allow a user to automatically eliminate "weak" variables from a process; i.e., those variables whose interactions can be attributed merely to random chance. In general, the "strength" of each variable in a test may be determined using any number of statistical tests; including, for example, by using a factorial experiment. According to many embodiments, the strength of each variable is represented as a P value, discussed in greater detail above. As is well known in the art, lower P values generally indicate "stronger" variables.

In at least one embodiment, interface 410 enables a user to specify the number of desired interactions in a process via interaction selection region 411. A user may also specify the highest allowable P value for each variable in the process in alpha selection region 412. For example, as illustrated in FIG. 14, a user may specify that only variables determined to have P values of under a specified value, such as 0.10, are to be considered. After specifying these values, a user may instruct the program to run the experiment by pressing pushbutton 414 (labeled, in one example, "Calculate") using a user input device. The results of the experiment may then be displayed in output display 416. Further, all variables and interactions exhibiting P values higher than the value specified in alpha selection 412 may be automatically removed from output display 416 (or designated as noise) by selecting pushbutton 418 (labeled, in one example, "Auto Reduce"). As illustrated in output display 416, only those variables and interactions having P values 420 of less that 0.10 remain. In at least one embodiment, these P values 420 may be highlighted, color coded, flagged, or otherwise emphasized to indicate that they fall within the specified P value tolerance.

Figure 15:
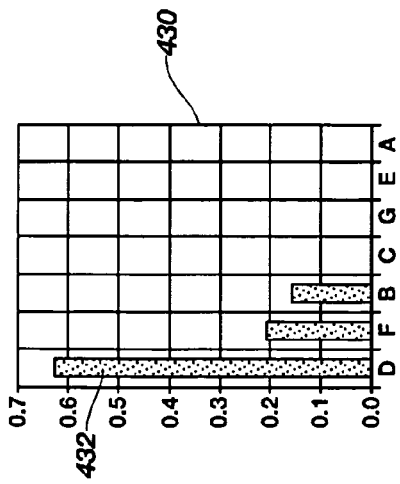
FIG. 15 is an illustration of an exemplary scree plot.

FIG. 15 is an illustration of an additional graphical representation of statistical data that may be displayed in main display area 210. In certain embodiments, an exemplary scree plot 430 capable of being displayed in main display area 210 generally comprises one or more columns of data 432 arranged in descending order by their height. Although scree plot 430 may be used to graphically display the results of any number of statistical tests, according to one aspect scree plot 430 graphically displays the results of a sum of squares or normalized sum of squares test (both of which are well known to those in the art) in descending order. When the data of these tests is arranged in this manner, the height of one or more of the later columns is typically insignificant when compared to the heights of the earliest columns. In many situations, this configuration looks very similar to scree (or rubble) at the base of a cliff; thus giving rise to the "scree" nomenclature.

By graphically presenting the results from a statistical test in this manner, a user of the program of the present invention can visually and quickly determine those variables that are relevant to the process and those that are not. For example, in the exemplary embodiment illustrated in FIG. 15, a user may be able to quickly ascertain that variables C, G, E and A are likely of negligible concern, as opposed to variables D, F, and B, which are likely of significant concern. In addition, in many embodiments, the heights of columns 432 form a sort of "elbow" or drastic division between two adjacent columns. For example, as seen in FIG. 15, the drastic height differential between column B and column C results in what resembles an "elbow." When an elbow such as this is formed in scree plot 430, a user may logically eliminate any variables subsequent to the elbow (namely, variables C, G, E and A) from consideration as weak or inactive variables.

Figures 16A, 16B, 16C:
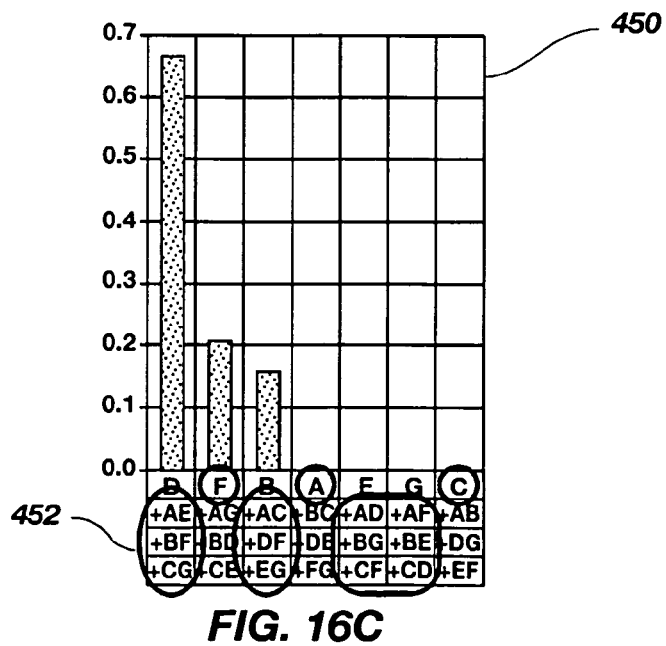
FIG. 16A is an illustration of an exemplary manner of displaying the results of a fractional factorial experiment.
FIG. 16B is an illustration of the results of the fractional factorial experiment in FIG. 16A, with the signs of each input variable reversed.
FIG. 16C is an illustration of an alternative exemplary graphical representation of the results of a fractional factorial experiment.

FIGS. 16A-16C are illustrations of additional graphical representations of statistical data that may be displayed in main display area 210. More particularly, FIGS. 16A-1C illustrate an exemplary manner for determining and graphically displaying the significant variables or interactions in a fractional factorial experiment. As is known in the art, a fractional factorial experiment is a test in which only an adequately chosen fraction of the treatment combinations required for the complete factorial experiment is selected to be run. While fractional factorial experiments typically result in significant resource savings by reducing the number of runs required in an experiment, the trade-off for this savings benefit is an inability to obtain an estimate of the main effect of a variable that is separate from an interaction effect for other variables in the process. In other words, the reduced number of runs in a fractional factorial experiment may result in the main effect estimate for an exemplary variable A being "confounded" with the estimate of the interaction effect for variables B and C (this effect is also known as "aliasing").

In at least one embodiment, as seen in FIGS. 16A-B, a display area 440 capable of being displayed in main display area 210 is configured to display one or more variables 442, one or more interactions 444, and the coefficient 446 and sum of squares value 448 (SSQ) for each variable 442 in a fractional factorial experiment. Generally speaking, the coefficient of a variable typically indicates the magnitude and direction in which each variable moves a process. For example, a coefficient of −5 indicates that for each unit increase in the variable, the output of the process decreases by 5. Conversely, a coefficient of +5 indicates that for each unit increase in the variable, the output of the process increases by 5. However, with respect to the coefficient values 446 displayed in FIG. 16A, because fractional factorial experiments involve relatively few observations, as discussed above, determining whether the magnitude of coefficient value 446 is caused by variable 442 alone, or whether this result is instead caused by one or more interactions 444, requires additional analysis.

FIG. 16B illustrates an exemplary manner for determining which variables 442 or interactions 444 in a process are responsible for the effects illustrated by the coefficient values 446 in FIG. 16A. In at least one embodiment, the signs of each interaction 446 in FIG. 16A (which are, in this embodiment, all negative) are reversed in FIG. 16B (in this case, to positive values). The coefficient values 446 for each variable 442 are then computed again and displayed in FIG. 16B. As seen in the exemplary embodiment illustrated in this figure, the coefficients values 446 for variables B, D, E and G retain the same sign in FIG. 16B as they had in FIG. 16A (i.e., those that were positive remained positive, while those that were negative remained negative). The most likely explanation for this is that the effects indicated by the coefficients for these variables were actually caused by the variables themselves, and not by one of the interactions associated with the variables. In contrast, because the signs of the coefficient values 446 for variables A, C, F and G were reversed in FIG. 16B, this most likely indicates that the effects indicated by the coefficients for these variables were caused by one of the interactions associated with these variables, instead of by the variables themselves. Thus, by keeping track of which coefficient values switched signs in this manner, a user may be able to determine which variables and interactions may be removed as statistically insignificant.

In an additional embodiment, a simplified manner of graphically representing the results of FIGS. 16A and 16B is illustrated in FIG. 16C. As shown in this figure, in certain embodiments an exemplary graph 450 illustrates, in column format, the magnitude of the measured effect of each variable 440 in FIGS. 16A and 16B. In addition, in at least one aspect of the invention, one or more variables or interactions are circled (as indicated by circles 452), highlighted, color coded, flagged or otherwise emphasized in FIG. 16C to indicate to a user that these variables may be removed as insignificant. As will be appreciated by those of skill in the art, in at least one embodiment only those variables whose coefficient signs changed in FIG. 16B (i.e., those variables whose effects may be attributed to other interactions) are circled. Similarly, only those interactions whose coefficient signs remained the same in FIG. 16B may be circled in FIG. 16C. By emphasizing those variables and interactions that may be removed as being statistically insignificant, FIG. 16C enables a user to quickly and easily determine which variables may be removed as insignificant, without having to keep track of which coefficient values 446 in FIGS. 16A and 16B switched signs or remained the same. FIG. 16C thus simplifies the interpretation and analysis of fractional factorial experiments for a user, enabling quick and efficient interpretation of the results of the same. FIG. 16C may either be displayed alone or in combination with FIGS. 16A and 16B.

Figure 17A:
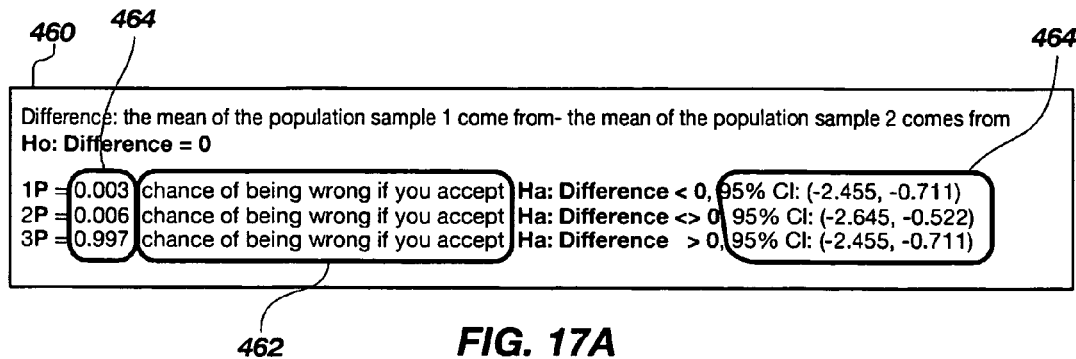
FIG. 17A is an illustration of an exemplary graphical representation of the results of a T-test.
Figure 17B:
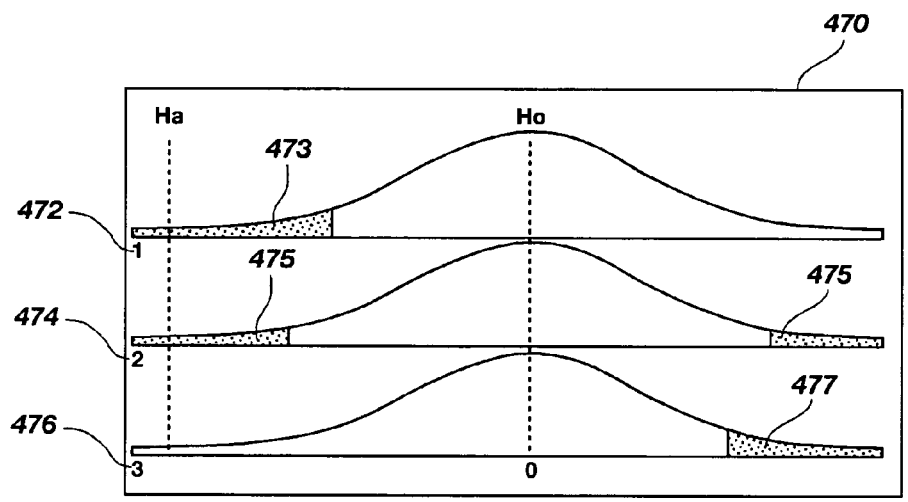
FIG. 17B is an illustration of an alternative exemplary graphical representation of the results of a T-test.

FIGS. 17A and 17B illustrate additional graphical representations of statistical data that may be displayed in main display area 210. As seen in FIG. 17A, in at least one embodiment an exemplary explanatory box 460 generally comprises one or explanatory statements 462 positioned next to one or more statistical data values 464. In many embodiments, statistical data values 464 represent outputs of various statistical experiments, while explanatory statements 462 contain text that explains "in plain English" the significance of the displayed statistical data values 464.

For example, in the exemplary embodiment illustrated in FIG. 17A, explanatory box 470 has been configured to help a user interpret the results of a T-test. As is known in the art, a T-test is a statistical tool that is used to determine whether the means of two samples are different or not. This is determined by first accepting the hypothesis that the two numbers are the same. If the T-test returns a p-value of more than 0.05, then the hypothesis is accepted, and the sets of numbers can be considered the same; otherwise, the sets of numbers are considered to be different. To help a user interpret the results of such a T-test, in the example illustrated in FIG. 17B a first explanatory statement 462 consists of text that indicates that a user has a 0.003 chance (as indicated by the P value of data value 464) of being wrong if the user accepts the hypothesis that the actual difference between the populations represented by the samples in the T-test is less than zero (or some other predetermined number). Similar explanatory statements 462 are displayed for the remaining hypotheses. Based on these explanatory statements, a user may quickly and simply determine that the difference between the means of the two samples is most likely less than zero (or some other predetermined number).

By providing explanatory statements (such as statements 462 in FIG. 17A) relating to data values 464 in this exemplary manner, explanatory box 460 allows a user to quickly and efficiently interpret the results of a statistical test. The time required for a user to interpret and synthesize the significance of the results of statistical tests may thus be reduced, resulting in increased efficiency and ease of use.

FIG. 17B illustrates an additional manner for graphically representing the results of a statistical test, such as a T-test. In at least one embodiment, an exemplary chart 470 for graphically representing the results of a T-test comprises a plurality of distributions 472, 474 and 476 illustrating the distributions of the possible alternative hypotheses of a T-test. For example, in this embodiment first representation 472 illustrates the distribution that would result if the hypothesis is accepted that the difference between the means of the two samples tested is less than zero, second representation 474 illustrates the distribution that would result if the hypothesis is accepted that the difference between the means of the two samples tested is different than zero, and third representation 476 illustrates the distribution that would result if the hypothesis is accepted that the difference between the means of the two samples tested is greater than zero. In at least one embodiment, a portion 473 in first representation 472 is illustrated highlighted, colored, or otherwise emphasized to illustrate the difference between the means of the two samples tested according to the first hypothesis. Portions 475 and 477 may also be similarly emphasized.

By graphically presenting the results of each hypothesis in the exemplary manner illustrated in chart 470, a user operating the quality analysis program may easily and quickly interpret and understand the significance of the results of the test. As with explanatory box 360, the time required for a user to interpret and synthesize the significance of the results of statistical tests presented in this manner may thus be reduced, resulting in increased efficiency and ease of use for users.

Figure 18:
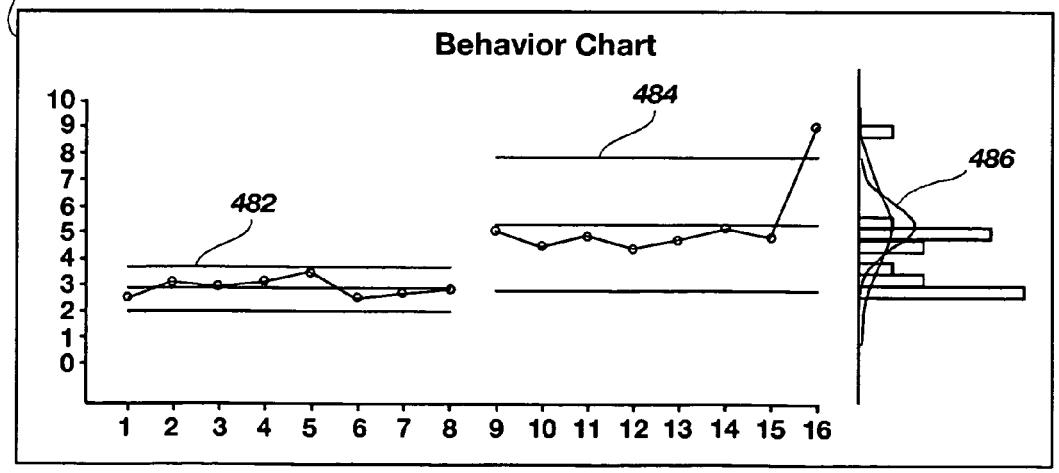
FIG. 18 is an illustration of an exemplary graphical representation of the results of one or more tests for homogeneity.

FIG. 18 illustrates an additional graphical representation of statistical data that may be displayed in main display area 210. As seen in this figure, in at least one embodiment an exemplary assumption test display area 480 comprises a first behavior chart 482, a second behavior chart 484, and a histogram 486. As is known to those of skill in the art, the assumption of homogeneous data is a critical assumption in many statistical tests. Generally speaking, data are deemed homogenous when no strong, unknown variables are present in the data of a process. Thus, in certain embodiments, this assumption of homogeneity may be tested by creating a behavior chart of the data involved in the process.

As seen in FIG. 18, exemplary assumption test display area 480 represents a manner for graphically displaying the results of one or more tests for homogeneity. In at least one embodiment, when a single input variable is involved in a process, the original data in the process is graphically displayed in a process behavior chart (such as behavior charts, such as 482, 484) in order to evaluate whether this original data is homogeneous. On the other hand, when more than one input variable is involved in the process, the residuals of the test are instead charted in the process behavior chart. As detailed above, a "residual" is the value from an original data set after the effects of the variables in this set have been removed.

In the embodiment illustrated in FIG. 18, a two sample T-test involving a single input variable was performed. Thus, because only a single input variable was involved in the T-test, the original data from each sample in the test may be plotted, instead of using the residuals thereof. For example, first behavior chart 482 in FIG. 18 graphically represents the behavior of the original data from a first sample of the T-test, while second behavior chart 484 graphically represents the behavior of the original data from the second sample of the T-test. As seen in first chart 482, each of the data values from the first sample fall within the specified limits, and may therefore be assumed as homogeneous. On the other hand, as seen in second chart 484, the last data point in the second sample falls outside of the specified limits, such that this data cannot be assumed as homogeneous, nor can it be relied upon as accurate.

Assumption test display area 480 thus enables a user to quickly and accurately determine whether the data in a process is homogeneous and thus reliable. Although in certain embodiments the type of process chart to be created and displayed in display area 480 (i.e., whether a process chart is to be created of the original data or the residuals of the data, as explained above), is determined and specified by a user, in at least one embodiment this decision is automatically made by a quality analysis program based on the number of input variables involved in the process, as discussed above.

In addition, while in certain embodiments process behavior charts (such as first and second behavior charts 482, 484) are generated and displayed separately from a histogram generated based on the same data (such as histogram 486), in at least one embodiment a histogram is displayed concurrently with, and in the same display area as, one or more process charts. For example, as seen in FIG. 18, a histogram 486 graphically representing the data presented in charts 482 and 484 may be generated and displayed in the same display area 480. Although the combination of histograms and process charts in a single display area may occur for any variety of statistical tests and experiments, in at least one embodiment a histogram for a capability study is simultaneously generated and concurrently displayed with a process chart based on the same capability study.

Figure 19:
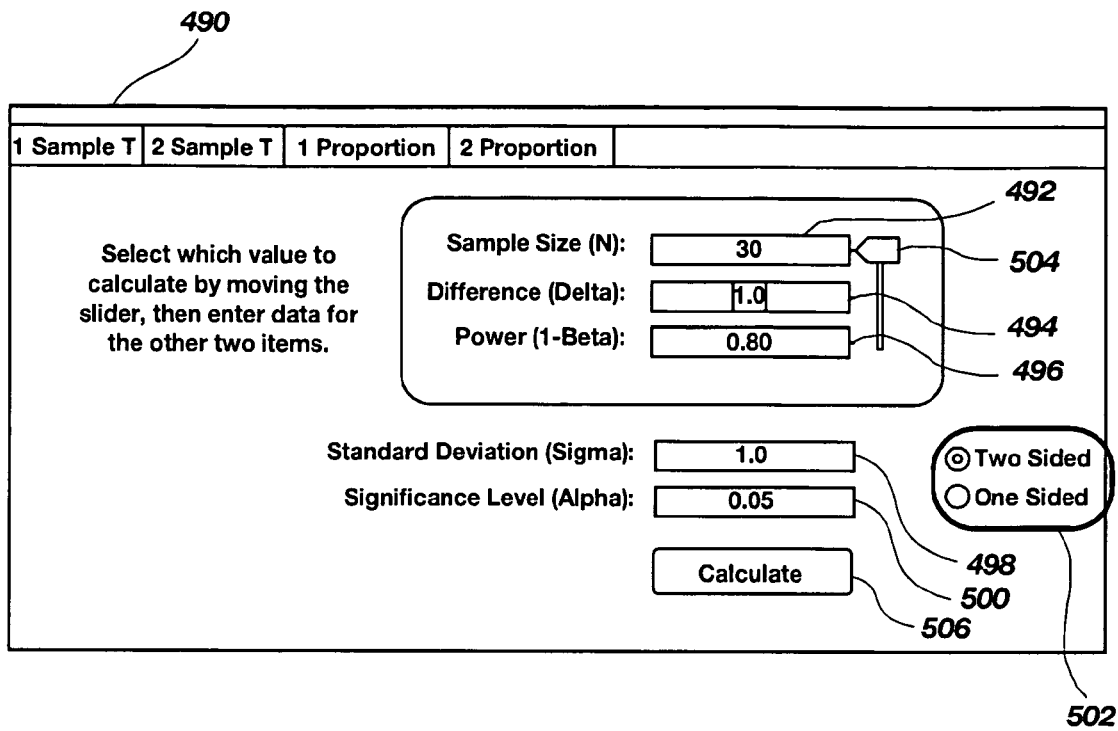
FIG. 19 is an illustration of an exemplary graphical user interface for enabling a user to determine an appropriate power value, difference value, and sample size for a statistical test.

FIG. 19 is an illustration of an exemplary graphical user interface for enabling a user to determine an appropriate power value, difference value, and sample size for a statistical test. In the exemplary embodiment illustrated in this figure, an input interface 490 comprises a plurality of input boxes (such as, for example, a sample size box 492, a difference box 494, a power box 496, a sigma box 498, and an alpha box 500), a selection region 502, a slider 504, and a pushbutton 506. Generally speaking, the sample size (N) of a test may be entered in sample size box 492, the difference value (delta) of a test may be entered in difference box 494, the power value (1-beta) of a test may be entered in power box 496, the standard deviation (sigma) of an undisturbed process may be entered in sigma box 498, and the significance level (alpha) of a test may be entered in alpha box 500.

According to certain embodiments, a user may request the calculation of an unknown variable (such as, for example, the sample size, difference value, or power value of a test) by positioning slider 504 using a user input device to point to one of the boxes representing the variable desired to be calculated. For example, as seen in FIG. 19, slider 504 may be positioned next to sample size box 492 when the sample size of a test is unknown to the user. A user may then request the calculation of the estimated sample size of the test by selecting pushbutton 506 (which, in some embodiments, is labeled "Calculate") after having entered the known values for each remaining input box 494, 496, 498, 500 and after having specified, in selection region 502, whether the process is one or two sided. The sample size of the test may then be calculated and displayed in box 492 using methods known to those of skill in the art.

Accordingly, the simplified interface of input interface 490 allows a user to quickly and easily request the computation of an unknown variable in light of other known variables. Advantageously, this configuration enables a user to quickly and easily determine the sample size that will be required to produce the degree of statistical certainty required for reliable interpretation (i.e., the power or 1-beta value of the test). While input interface 490 may be adapted for use in connection with any variety of tests and experiments, in certain embodiments this interface is tailored for use in connection with T-tests and proportion tests.

Figure 20B:
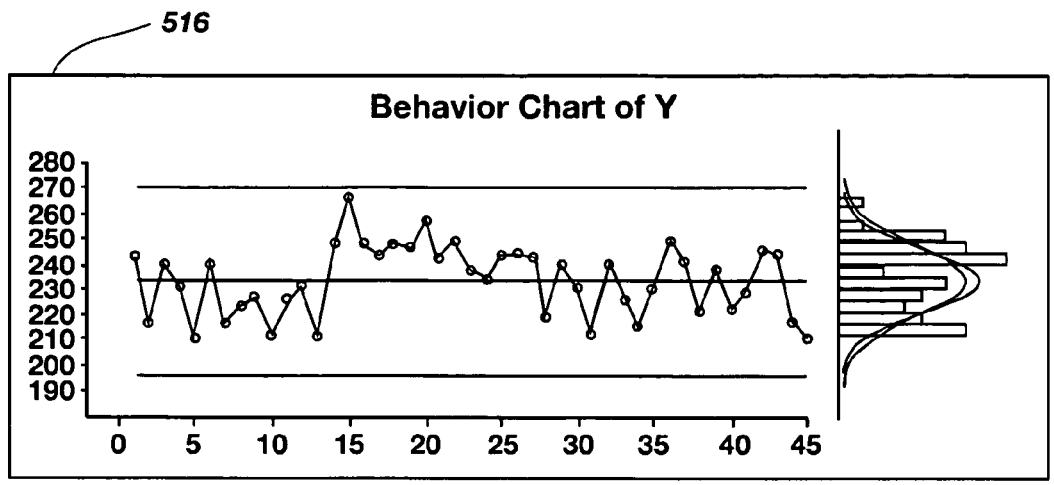
FIG. 20B is an illustration of an exemplary process behavior chart generated based on an input variable selected in FIG. 20A.
Figure 20C:
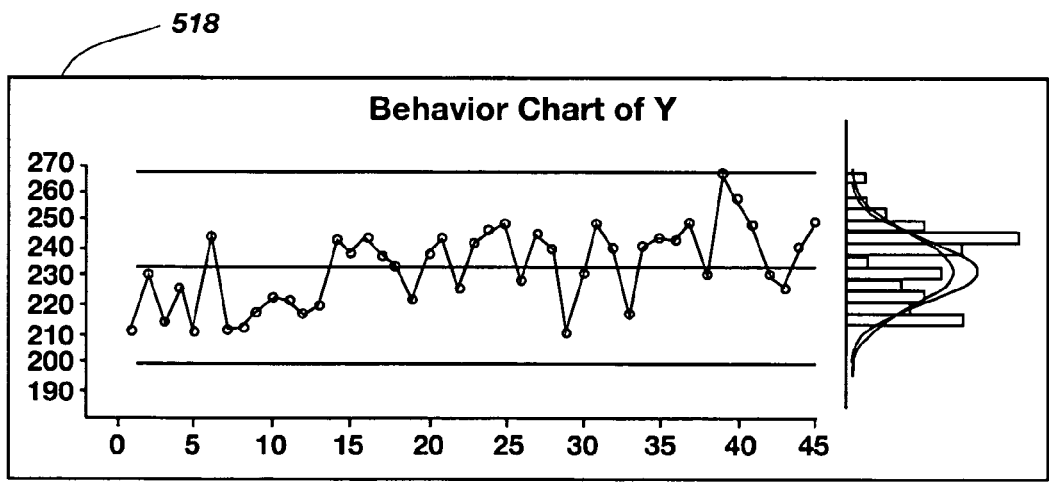
FIG. 20C is an illustration of an exemplary process behavior chart generated based on an additional input variable selected in FIG. 20A.

FIG. 20A is an illustration of an exemplary graphical user interface for enabling a user to sort the results of a test based on an input variable. FIGS. 20B and 20C are illustrations of exemplary process behavior charts generated based on input variables selected in FIG. 20A. As detailed above in connection with FIG. 12, in at least one embodiment of the present invention a user may designate the type of variable contained in each column in a data table (such as data table 380 in FIG. 12). Similarly, in an additional embodiment of the present invention, a user may sort data in a data table by variable, or may request the generation of a process chart for a specific variable or variable type in a data table. For example, as seen in FIG. 20A, a user may trigger the display of a main pop-up menu 512 by selecting a variable contained in a data table 510 using a user input device, such as a mouse. Using the input device, the user may then position a cursor over the option "Sort," which triggers the display of a secondary pop-up menu 514. The user may then cause the data in data table 510 to be sorted (in either ascending or descending order) based on the selected variable by selecting either of the options (in this case, "Ascending" and "Descending") displayed in secondary pop-up menu 514. For example, if the user chooses to sort, in ascending order, a set of data based on the input variable "Average Temperature," the runs of data in the data table will be arranged, in ascending order, by the value of their average temperature.

In addition, once the data in data table 510 has been sorted according to a selected variable, a behavior chart (such as behavior charts 516, 518) based on the outputs of the sorted variables may be generated and displayed in main display area 210. These behavior charts may be generated for categorical variables (as is the case for chart 516 in FIG. 20B), or interval/ratio variables (as is the case for chart 518 in FIG. 20C). Advantageously, by sorting and graphically charting data values based on a selected variable, a user may discover trends that might otherwise have been missed when displayed in conventional manners.

Figure 21:
FIG. 21 is an illustration of an exemplary manner of graphically representing the amount of uncertainty present in a test.

FIG. 21 is an illustration of an additional graphical representation of statistical data that may be displayed in main display area 210. As seen in this figure, in at least one embodiment a graphic 520 comprises a lower specification limit 522, an upper specification limit 524, a lower uncertainty zone 526, and an upper uncertainty zone 528. Generally speaking, graphic 520 graphically illustrates the amount of uncertainty present in a statistical test or experiment. As is known to those of skill in the art, the measurement systems used to measure the outputs of processes can only inherently measure values to a finite amount. Values falling below this finite amount are thus indistinguishable to the measuring system. The relative width of uncertainty in such a measurement system may thus be graphically represented using uncertainty zones 526, 528. For example, the larger the width of an uncertainty zone is relative to the width between specification limits 522, 524, the less likely the measurement system will be able to accurately and reliably distinguish non-conforming material from conforming material. Conversely, the smaller the widths of the uncertainty zones are relative to the distance between specification limits 522, 524, the more likely it is that the measurement system will be able to accurately distinguish between conforming and non-conforming material. By graphically representing the relative width of the uncertainty of a measurement system in this exemplary manner, graphical representation 520 thus enables a user to quickly determine the relative reliability of a measurement system.

Figure 22:
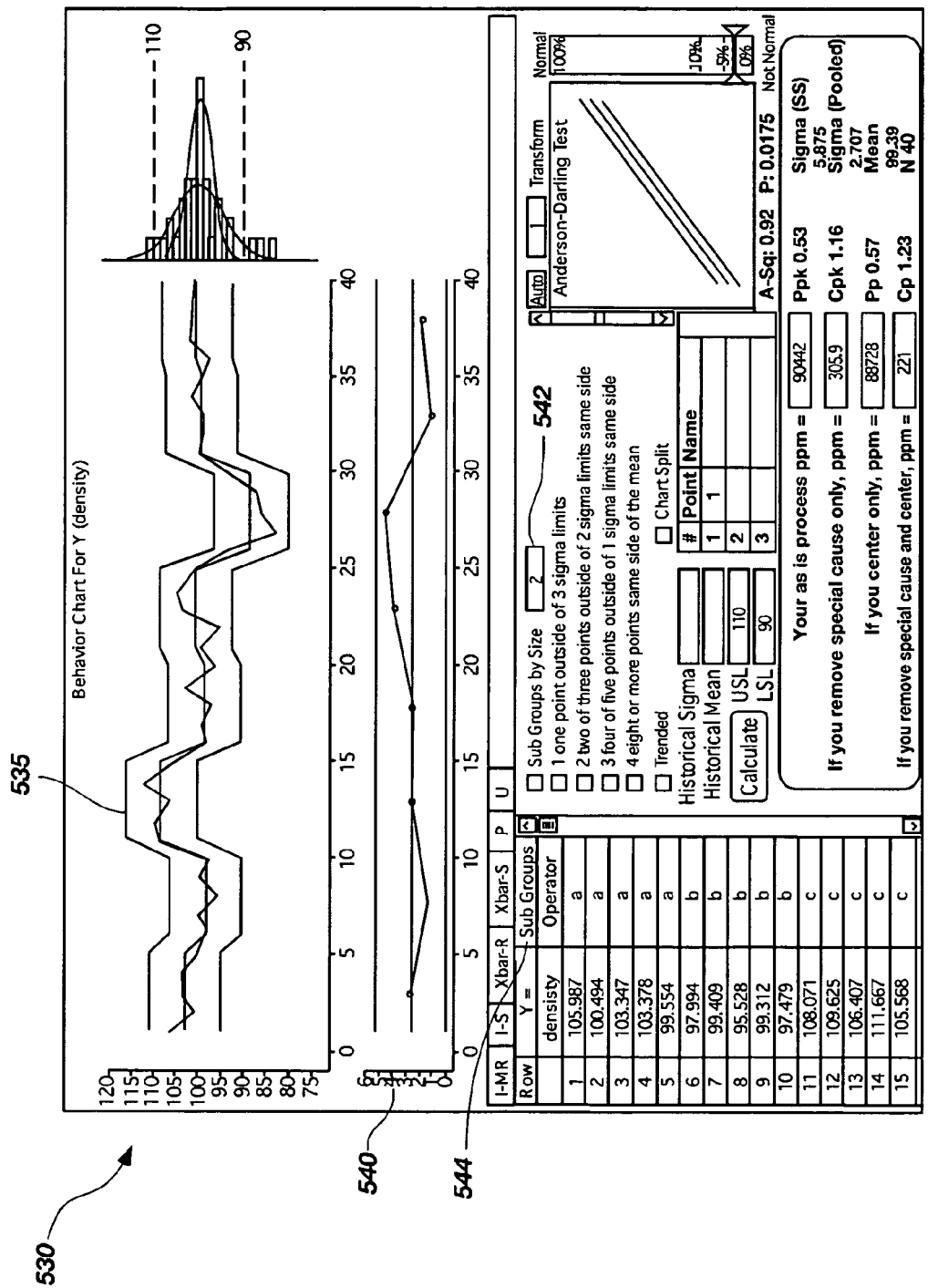
FIG. 22 is an illustration of an exemplary process behavior chart arranged into subgroups.

FIG. 22 is an illustration of an additional graphical representation of statistical data that may be displayed in main display area 210. As seen in this figure, in at least one embodiment a subgroup display area 530 comprises a subdivided behavior chart 535, an S chart 540, a subgroup size input box 542, and a subgroup column 544. According to this exemplary embodiment, when a user suspects that operator control differences are contributing to undesirable process variation, the user may de-select a check box next to input box 542 using a user input device, such as a mouse. In response to the user's de-selection of the check box, a subgroup column 544 listing the operators by variable type, such as, in this example, by operator, may be displayed. A user may then request the generation of a behavior chart 535 sorted by the selected subgroup (in this example, by operator) by selecting a pushbutton (not shown) displayed in interface 530. In addition, S chart 540 may be generated to display the standard deviation of each subgroup. As is known to those of skill in the art, an S chart is merely a plot of the standard deviation of a process taken at regular intervals to indicate whether there is any systematic change in the process variability. In many embodiments, data points falling outside of the limit lines in S chart 540 indicate a subgroup with detectably larger variation than the other groups.

As seen in FIG. 22, the centerline for each subgroup in chart 535 may be centered on the subgroup mean, while the limits lines for each subgroup may be calculated based on the pooled variance of the data. By dividing the data by subgroup in this manner, a user is able to quickly and simply appreciate differences in output variables for each subgroup (in this case, by operator). For example, in the example illustrated in FIG. 22, the output differences between the third and sixth subgroups in graph 535 are readily apparent by presenting the data in this manner, which may prompt the user to investigate the causes for these significant differences in operator output.

Figure 23:
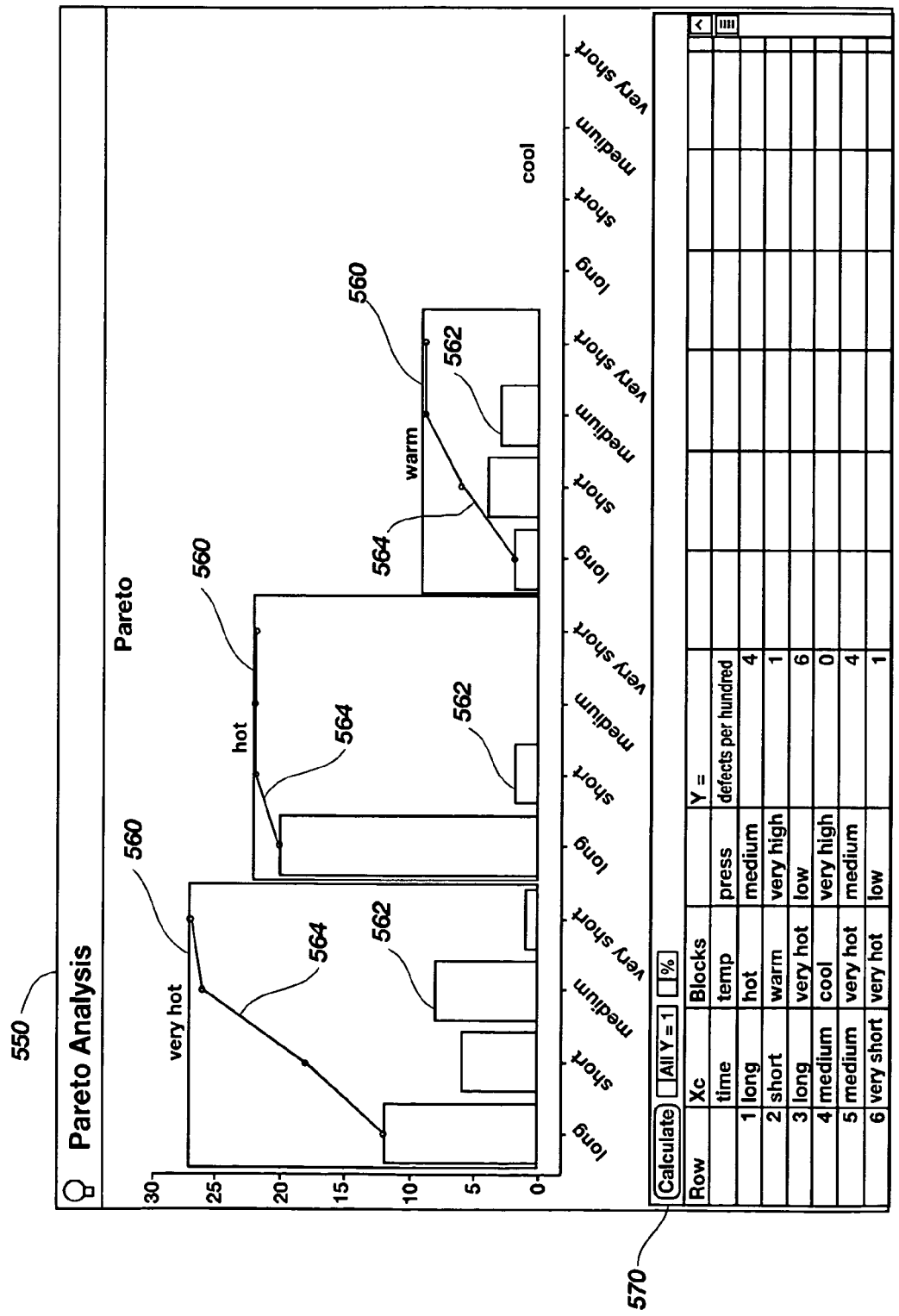
FIG. 23 is an illustration of a modified Pareto chart according to one embodiment.

FIG. 23 is an illustration of an additional graphical representation of statistical data that may be displayed in main display area 210. As seen in this figure, in at least one embodiment a Pareto display area 550 comprises one or more multi-variable Pareto charts 560 and a data table 570. Charts 560 may generally comprise one or more main variable columns 562, one or more secondary variable columns 564, and a line graph 566. Generally speaking, main variable columns 562 graphically represent the magnitude of an effect caused by a main input variable, while secondary variable columns 564 graphically represent the magnitude of an effect caused by a secondary input variable. As will be appreciated, either of these variables (namely, the main variable and the secondary variable) may be a categorical type input variable or an interval/ratio type input variable. Line graph 566 may also be displayed within main variable column 562 to graphically illustrate the cumulative sum of the values of each column 564 blocked within main variable column 562.

For example, in the embodiment illustrated in FIG. 23, a statistical experiment was performed to investigate the effects of three categorical input variables (namely, time, temperature and pressure) on the number of defects produced in a plastic bag sealing process. In this experiment, the number of defects produced in the process (per hundred runs) was measured for each of the possible settings of the categorical input variables (in this case, the input variable "time" was varied between very short, short, medium, and long time settings, the input variable "pressure" was varied between low, medium, high, and very high pressure settings, and the input variable "temperature" was varied between cool, warm, hot, and very hot temperature settings). In FIG. 23, the number of defects produced at each temperature setting is displayed in descending order as main variable columns 562. Each main column 564 is also further broken down into secondary variable columns 564 to illustrate how many of the total defects for each main column 562 were produced at each time setting.

By graphically presenting the results of statistical tests in this manner, a user may quickly and simply determine the relationship between one or more input variables and the number of defects produced in a process. In the exemplary embodiment illustrated in FIG. 23, for example, the user may likely determine that higher temperatures have an adverse effect on the number of defects produced in the process since the number of defects reduces as the temperature is progressively reduced from the "very hot" to the "cold" temperature setting. The user may also likely decide that the optimal combined time and temperature settings for the process are "very short" and "cool," since the lowest number of combined defects were produced at these settings. Thus, by graphically displaying one variable "blocked" within another in this manner, exemplary charts 560 provide greater insight to a user, often allowing the user to catch defect causes that are interactions, rather than single effects.

Figure 24:
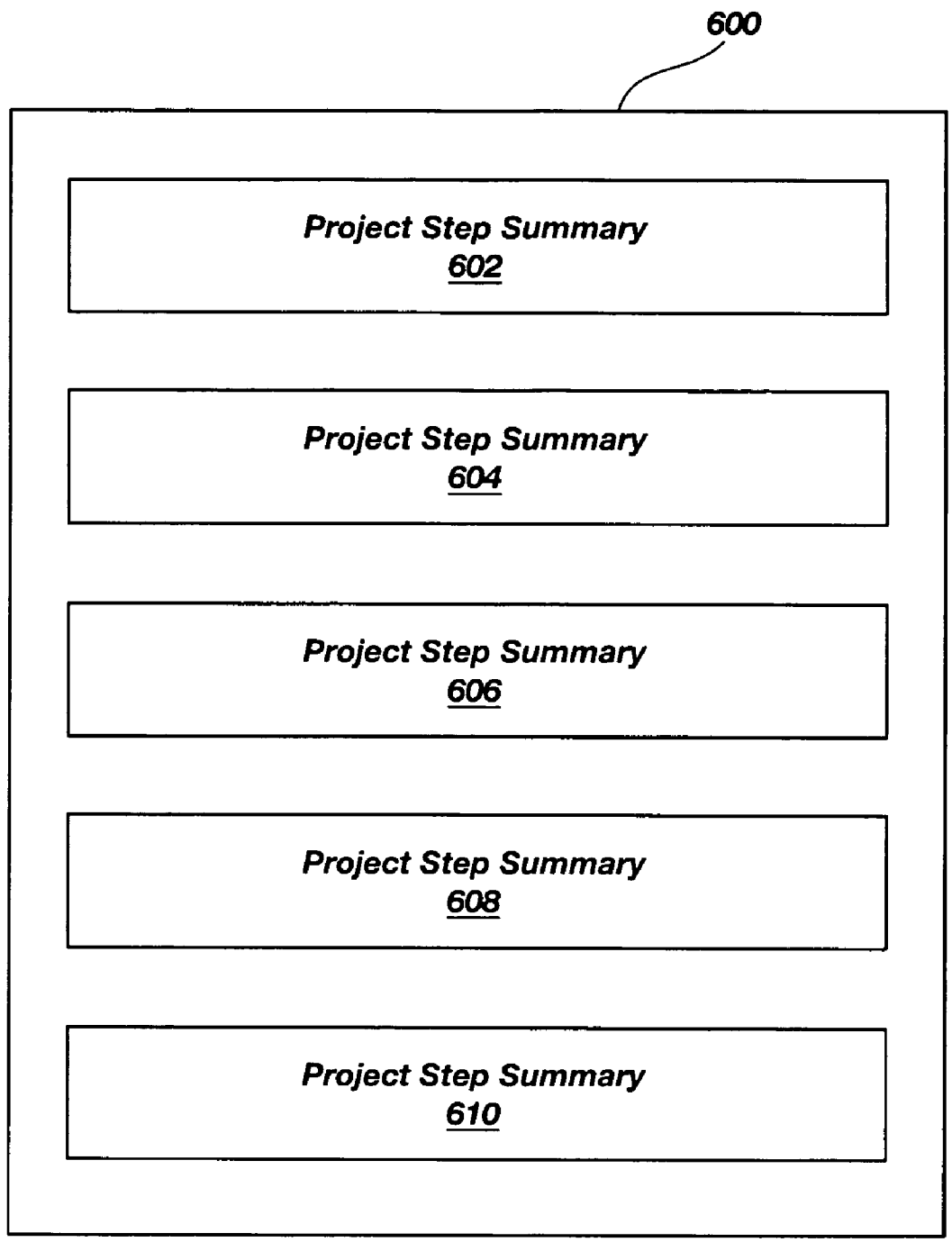
FIG. 24 is an illustration of an exemplary final report according to one embodiment.

FIG. 24 is an illustration of an exemplary final project report that may be displayed in main display area 210. Although one or more of the preceding graphical representations may be separately displayed on discrete pages, in at least one embodiment one or more of these representations are presented simultaneously as a single, final report and summary of the quality analysis project upon completion of the project. For example, as seen in FIG. 24, one or more project step summary reports 602-610 may be displayed in a single screen as a final project report 600. Generally speaking, reports 602-610 comprise textual or graphical representations summarizing the results of each step of a quality analysis project (such as, for example, each step in a Six Sigma Define-Measure-Analyze-Improve-Control project). Report 600 may either be created and displayed at the request of a user (by, for example, selecting a pushbutton using a user input device) or automatically generated by the quality analysis program at the completion of each step in the project. Project report 600 may additionally contain notes, remarks, explanatory statements, or other comments entered by the user during of the project. In addition to being displayed in main display area 210, project report 600 may also be printed by a printing device, such as a laser printer, connected to computer system 100. By graphically presenting the results of each step in a project in this exemplary manner, project report 600 enables a user to quickly and simply analyze the results of an entire project.

Figure 25:
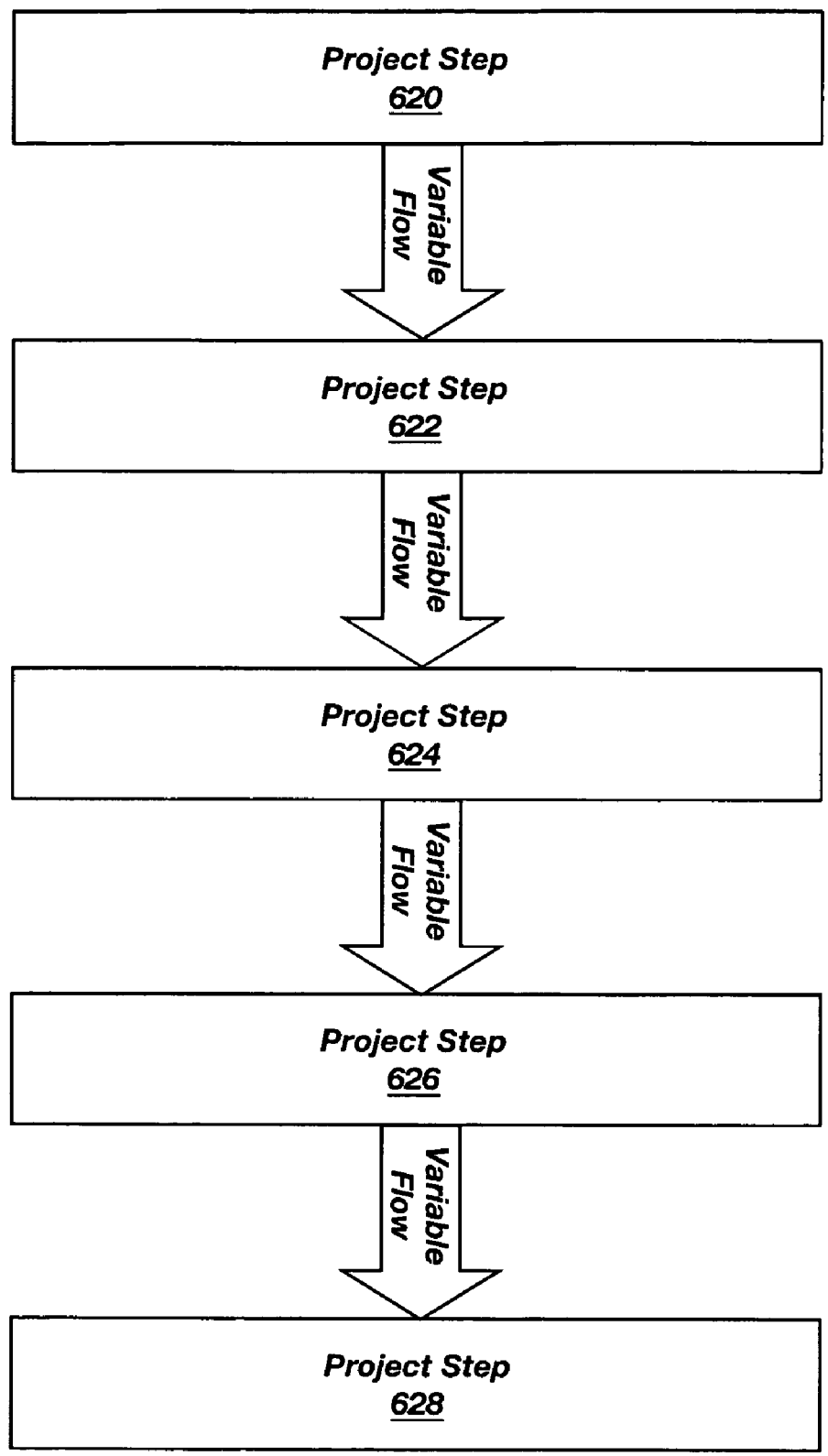
FIG. 25 is a chart illustrating the flow of variables between various project steps in a quality analysis computer program according to one embodiment of the present invention.

FIG. 25 is a chart illustrating the flow of variables between various project steps in a quality analysis computer program according to one embodiment of the present invention. Since, generally speaking, each of the above-described project steps 222 and tools 226 in the above-described quality analysis project are used in concert, rather than individually, in at least one embodiment variables created and used in one of the projects steps or tools of the project are carried forward for use in subsequent steps or tools. For example, as seen in FIG. 25, in certain embodiments one or more of the variables created, defined, or manipulated in a first project step 620 may, upon completion of this step, be forwarded or "rolled forward" to a second project step 622 for use in this second step. Similarly, the variables created, defined, or otherwise manipulated in second project step 622 may be rolled forward to third project step 624, and so on until the completion of the project. Generally speaking, project steps 620-628 represent the steps used by any one of various quality analysis or improvement tools or programs; including, for example, Six Sigma, Lean, Plan-Do-Check-Act, the Toyota Production System, Total Quality analysis (TQM), and other such tools and programs. Project steps 620-628 may also represent one or more of a variety of statistical tools used during the project steps of a quality analysis project.

For example, the values of the KPIVs used during the creation of a process map may be carried forward and automatically entered into a subsequently created cause and effect matrix. Similarly, variables entered in this cause and effect matrix may be automatically rolled forward for use in a subsequent tool or test, such as a failure and modes analysis (FMEA). Further, one or more of the variables that are found to significant in the FMEA may be assigned action items, which may become a part of an Action Plan in the "Improve" step of a project. Finally, the most critical items in the Action Plan may be assigned a Control Plan, which is a key part of the "Control" step of the overall project.

By automatically carrying or rolling forward the variables created, defined, or otherwise manipulated in a project step or tool in this exemplary manner, the task of a project leader is greatly simplified. This exemplary configuration thus saves the user from having to remember and enter in the values of each variable created, defined, or otherwise manipulated in each step. Various efficiency gains and realized, and the overall ease of use of the program is increased.

The preceding description has been provided to enable others skilled in the art to best utilize the invention in various embodiments and aspects and with various modifications as are suited to the particular use contemplated. This exemplary description is not intended to be exhaustive or to limit the invention to any precise form disclosed. Many modifications and variations in the form and details are possible without departing from the spirit and scope of the invention. For example, while a quality analysis program and graphical user interface for the same have been described with reference to specific types of menus and control objects, it will be appreciated that the practical applications of the invention are not limited to the disclosed embodiments. Rather, with an understanding of the principles which underlie the invention, its applicability to many different types of graphical user interfaces, and the controllable elements within such interfaces, will be readily apparent.

For ease of use, the words "including" and "having," as used in the specification and claims, are interchangeable with and have the same meaning as the word "comprising." It is intended that the scope of the invention be defined by the following claims.

What is claimed is:

1. A graphical user interface for a quality analysis computer program, the interface and computer program being stored as computer-readable instructions on a computer-readable medium, the interface comprising:
   a first display area for displaying graphical representations of statistical data, wherein the graphical representations comprise:
       one or more data boxes containing statistical data from a statistical test;
       explanatory statement boxes containing text explaining the significance of the statistical data contained in the data boxes;
   a second display area for displaying:
       one or more quality analysis project steps in a quality analysis project;
       one or more statistical tool categories associated with the one or more quality analysis project steps;
       one or more statistical tools associated with the one or more statistical tool categories.

2. The interface according to claim 1, further comprising one or more status indicators for graphically displaying the status of each quality analysis project step in the quality analysis project.

3. The interface according to claim 1, wherein the graphical representations comprise one or more slider bars for graphically representing results of a statistical test.

4. The interface according to claim 1, wherein the graphical representations comprise a control chart, the control chart comprising:
   a trendline serving as a centerline of the control chart;
   parallel limit lines having the same slope as and positioned to surround the trendline.

5. The interface according to claim 1, further comprising a behavior chart interface displayed in the first display area and configured to enable a user to split a process behavior chart into segments, the behavior chart comprising an input box for receiving a beginning point of each segment of the process behavior chart.

6. The interface according to claim 1, wherein the graphical representations comprise:
   a chart graphically representing statistical data;
   a data table containing the statistical data represented in the chart;
   wherein statistical data selected by a user in the chart is automatically highlighted in the data table.

7. The interface according to claim 1, wherein statistical data selected by a user in one of the graphical representations is automatically highlighted in other graphical representations.

8. The interface according to claim 1, wherein the graphical representations comprise a process map configured to display an order of one or more process steps;
   wherein the order of the process steps is modifiable by a user.

9. The interface according to claim 8, further comprising a step efficiency value displayed in each process step.

10. The interface according to claim 1, further comprising one or more test variables for use in the quality analysis project steps and the statistical tools of the quality analysis project;
    wherein the statistical data and test variables used in prior quality analysis project steps and statistical tools are automatically carried forward for use in subsequent quality analysis project steps and statistical tools.

11. The interface according to claim 1, wherein the graphical representations comprise a chart illustrating values of one or more variables ranked in order of their potential influence on a process;
    wherein one or more of the variables is removable by a user.

12. The interface according to claim 1, further comprising one or more user-defined input variables for use in performing the quality analysis project steps;
    wherein one or more of the user-defined variables are designated by a user as an output variable, an interval input variable, or a categorical input variable.

13. The interface according to claim 12, wherein a regression method is used to determine a relationship between the user-defined variables when one or more user-defined variables are designated as interval input variables; and
    an analysis of variance (ANOVA) method is used to determine a relationship between the user-defined variables when one or more of the user-defined variables are designated as categorical input variables.

14. The interface according to claim 1, wherein the graphical representations comprise a graphical gauge for graphically representing a power value of a statistical test.

15. The interface according to claim 14, wherein the graphical gauge is a gas gauge or a slider bar.

16. The interface according to claim 1, wherein the graphical representations comprise a process behavior chart generated for a user-selected input variable.

17. The interface according to claim 1, wherein the graphical representations comprise a final project report, the final project report comprising one or more graphical summaries of each step in the quality analysis project;

wherein the final project report is automatically generated upon completion of all of the quality analysis project steps in the quality analysis project.

18. A graphical user interface for a quality analysis computer program, the interface and computer program being stored as computer-readable instructions on a computer-readable medium, the interface comprising:
a first display area for displaying graphical representations of statistical data;
a second display area for displaying:
one or more quality analysis project steps in a quality analysis project, wherein the second display area also displays whether or not the one or more quality analysis project steps are completed;
one or more statistical tool categories associated with the one or more quality analysis project steps;
one or more statistical tools associated with the one or more statistical tool categories;
a capability study display area displayed in the first display area and configured to display results of a capability study, the capability study display area comprising:
a first portion displaying a percentage of non-conforming material produced in a process;
a second portion displaying a percentage of non-conforming material that would be produced in the process if an extraordinary variation is removed;
a third portion displaying a percentage of non-conforming material that would be produced in the process if a mean of the process is centered between specification limits;
a fourth portion displaying a percentage of non-conforming material that would be produced in the process if the extraordinary variation is removed and the mean of the process is centered.

19. A graphical user interface for a quality analysis computer program, the interface and computer program being stored as computer-readable instructions on a computer-readable medium, the interface comprising:
a first display area for displaying graphical representations of statistical data;
a second display area for displaying:
one or more quality analysis project steps in a quality analysis project, wherein the second display area also displays whether or not the one or more quality analysis project steps are completed;
one or more statistical tool categories associated with the one or more quality analysis project steps;
one or more statistical tools associated with the one or more statistical tool categories;
a factorial experiment design area displayed in the first display area, the factorial experiment design area comprising:
a first portion for receiving an experiment type;
a second portion for receiving a factor number and a run number;
a third portion for receiving an acceptable alpha risk;
a fourth portion for receiving a replicate value, a centerpoint value, and a block value.

20. The interface according to claim 19, further comprising:
a fifth portion for receiving an interaction value;
a sixth portion for receiving a P limit value.

21. A graphical user interface for a quality analysis computer program, the interface and computer program being stored as computer-readable instructions on a computer-readable medium, the interface comprising:
a first display area for displaying graphical representations of statistical data, wherein the graphical representations comprise a fractional factorial display configured to graphically represent results of a fractional factorial experiment, wherein statistically insignificant results of the fractional factorial experiment are automatically highlighted in the fractional factorial display;
a second display area for displaying:
one or more quality analysis project steps in a quality analysis project;
one or more statistical tool categories associated with the one or more quality analysis project steps;
one or more statistical tools associated with the one or more statistical tool categories.

22. The interface according to claim 21, wherein the graphical representations comprise a scree plot.

23. A graphical user interface for a quality analysis computer program, the interface and computer program being stored as computer-readable instructions on a computer-readable medium, the interface comprising:
a first display area for displaying graphical representations of statistical data, wherein the graphical representations comprise:
a first graph illustrating a distribution of a T-test when an actual difference between two population samples is assumed to be less than a pre-determined number;
a second graph illustrating the distribution of a T-test when the actual difference between the two population samples is assumed to be more than the pre-determined number;
a third graph illustrating the distribution of a T-test when the actual difference between the two population samples is assumed to be different from the pre-determined number;
a second display area for displaying:
one or more quality analysis project steps in a quality analysis project, wherein the second display area also displays whether or not the one or more quality analysis project steps are completed;
one or more statistical tool categories associated with the one or more quality analysis project steps;
one or more statistical tools associated with the one or more statistical tool categories.

24. A graphical user interface for a quality analysis computer program, the interface and computer program being stored as computer-readable instructions on a computer-readable medium, the interface comprising:
a first display area for displaying graphical representations of statistical data, wherein the graphical representations comprise:
a first process behavior chart for graphically illustrating the value of variables in a single input variable process;
a second process behavior chart for graphically illustrating the value of residuals in a multiple input variable process;
a second display area for displaying:
one or more quality analysis project steps in a quality analysis project, wherein the second display area also displays whether or not the one or more quality analysis project steps are completed;
one or more statistical tool categories associated with the one or more quality analysis project steps;
one or more statistical tools associated with the one or more statistical tool categories.

25. A graphical user interface for a quality analysis computer program, the interface and computer program being stored as computer-readable instructions on a computer-readable medium, the interface comprising:
  a first display area for displaying graphical representations of statistical data, wherein the graphical representations comprise:
    a first input box for receiving a sample size value;
    a second input box for receiving a difference value;
    a third input box for receiving a power value;
  wherein one of the sample size value, the difference value, and the power value of the test is automatically computed and displayed after the other two values are provided;
  a second display area for displaying:
    one or more quality analysis project steps in a quality analysis project, wherein the second display area also displays whether or not the one or more quality analysis project steps are completed;
    one or more statistical tool categories associated with the one or more quality analysis project steps;
    one or more statistical tools associated with the one or more statistical tool categories.

26. A graphical user interface for a quality analysis computer program, the interface and computer program being stored as computer-readable instructions on a computer-readable medium, the interface comprising:
  a first display area for displaying graphical representations of statistical data, wherein the graphical representations comprise:
    a capability process behavior chart;
    a capability histogram simultaneously displayed with the process behavior chart;
  a second display area for displaying:
    one or more quality analysis project steps in a quality analysis project, wherein the second display area also displays whether or not the one or more quality analysis project steps are completed;
    one or more statistical tool categories associated with the one or more quality analysis project steps;
    one or more statistical tools associated with the one or more statistical tool categories.

27. A graphical user interface for a quality analysis computer program, the interface and computer program being stored as computer-readable instructions on a computer-readable medium, the interface comprising:
  a first display area for displaying graphical representations of statistical data, wherein the graphical representations comprise a chart, the chart comprising:
    user-defined upper and lower specification limits illustrating upper and lower specification limits of a process;
    upper and lower uncertainty zones configured to graphically display an amount of uncertainty present in a measurement system relative to the width of the upper and lower specification limits;
  a second display area for displaying:
    one or more quality analysis project steps in a quality analysis project, wherein the second display area also displays whether or not the one or more quality analysis project steps are completed;
    one or more statistical tool categories associated with the one or more quality analysis project steps;
    one or more statistical tools associated with the one or more statistical tool categories.

28. A graphical user interface for a quality analysis computer program, the interface and computer program being stored as computer-readable instructions on a computer-readable medium, the interface comprising:
  a first display area for displaying graphical representations of statistical data, wherein the graphical representations comprise a single process behavior chart arranged into subgroups;
  wherein a centerline of each subgroup of the process behavior chart is centered on a subgroup mean;
  a second display area for displaying:
    one or more quality analysis project steps in a quality analysis project, wherein the second display area also displays whether or not the one or more quality analysis project steps are completed;
    one or more statistical tool categories associated with the one or more quality analysis project steps;
    one or more statistical tools associated with the one or more statistical tool categories.

29. A graphical user interface for a quality analysis computer program, the interface and computer program being stored as computer-readable instructions on a computer-readable medium, the interface comprising:
  a first display area for displaying graphical representations of statistical data, wherein the graphical representations comprise a chart, the chart comprising:
    one or more main variable columns graphically representing a magnitude of an effect caused by a main input variable;
    one or more secondary variable columns blocked within each main variable column and graphically representing a magnitude of an effect caused by a secondary input variable;
    a line graph displayed within each main variable column and graphically representing a cumulative sum of the values of each secondary variable column;
  a second display area for displaying:
    one or more quality analysis project steps in a quality analysis project;
    one or more statistical tool categories associated with the one or more quality analysis project steps;
    one or more statistical tools associated with the one or more statistical tool categories.

* * * * *